US006639943B1

(12) United States Patent
Radha et al.

(10) Patent No.: US 6,639,943 B1
(45) Date of Patent: Oct. 28, 2003

(54) HYBRID TEMPORAL-SNR FINE GRANULAR SCALABILITY VIDEO CODING

(75) Inventors: Hayder Radha, Mahwah, NJ (US); Yingwei Chen, Ossining, NY (US); Mihaela Van Der Schaar, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 541 days.

(21) Appl. No.: 09/590,825

(22) Filed: Jun. 9, 2000

Related U.S. Application Data
(60) Provisional application No. 60/167,067, filed on Nov. 23, 1999.

(51) Int. Cl.[7] .................................................. H04N 7/12

(52) U.S. Cl. ........................... 375/240.11; 375/240.19

(58) Field of Search ....................... 375/240.11, 240.01, 375/240.1, 240.05, 240.19; 348/398.1, 397.1; 382/240

(56) References Cited

U.S. PATENT DOCUMENTS

| | | | | |
|---|---|---|---|---|
| 5,001,561 A | * | 3/1991 | Haskell et al. ......... | 375/240.02 |
| 5,218,435 A | * | 6/1993 | Lim et al. ............... | 375/240.16 |
| 5,742,892 A | | 4/1998 | Chaddha ................... | 725/146 |
| 5,852,565 A | * | 12/1998 | Demos ...................... | 708/203 |
| 5,963,257 A | * | 10/1999 | Katata et al. ........... | 375/240.11 |
| 5,973,755 A | * | 10/1999 | Gabriel ....................... | 348/699 |
| 6,057,884 A | * | 5/2000 | Chen et al. .............. | 375/240.16 |

(List continued on next page.)

FOREIGN PATENT DOCUMENTS

| | | | | |
|---|---|---|---|---|
| EP | 0644695 A3 | 3/1995 | ............ | H04N/7/24 |
| EP | 0644695 A2 | 3/1995 | ............ | H04N/7/24 |
| EP | 0771119 A2 | 5/1997 | ............ | H04N/7/50 |
| EP | 0771119 A3 | 5/1997 | ............ | H04N/7/50 |
| EP | 0579395 B1 | 9/1998 | ............ | H04N/7/24 |
| EP | 0869620 A2 | 10/1998 | ............ | H03M/7/30 |
| EP | 0884850 A2 | 12/1998 | ............ | H03M/7/30 |
| WO | WO9933274 | 7/1999 | ............ | H04N/7/26 |
| WO | 0005898 | 2/2000 | | |

OTHER PUBLICATIONS

Morrison et al., "Two–layer video coding for ATM networks", Signal Processing: Image Communications 3, pp. 179–195, 1991.*

Radha H et al.: "Scalable Internet Video Using MPEG–R", Sep. 1999, pp. 95–126.

Vial J.F.: "Motion Compensation in DCT–Domain for Scalable Coding with Fine Granularity", ITG Fachberichte, VDE Verlag, Berlin, DE, No 143, 1997, pp. 485–489, XP000965452.

Van Der Schaar M et al.: "Scalable MPEG–4 Video Coding Graceful Packet–Loss Resilience over Bandwidth–Varying Networks" Jul. 30, 2000, pp. 1487–1490 vol. 3, XP000981416.

*Primary Examiner*—Vu Le
(74) *Attorney, Agent, or Firm*—Russell Gross

(57) ABSTRACT

The present invention is directed to fine granular coding technique that includes both quality and temporal scalability. This is accomplished by utilizing a hybrid temporal/SNR scalability structure that is readily adaptable to fine granular coding techniques. In one example of this structure, temporal enhancement frames and FGS enhancement frames are included in a single enhancement layer. In another example, two distinct enhancement layers are used to achieve the hybrid temporal-SNR scalability. The two layers include a temporal scalability layer to achieve the temporal enhancement for the base-layer (i.e., better motion), while an FGS layer is used to improve the quality SNR of the base-layer and/or the temporal-scalability enhancement layer.

17 Claims, 21 Drawing Sheets

U.S. PATENT DOCUMENTS

| | | | |
|---|---|---|---|
| 6,173,013 B1 * | 1/2001 | Suzuki et al. | 375/240.16 |
| 6,229,850 B1 * | 5/2001 | Linzer et al. | 375/240.11 |
| 6,263,022 B1 * | 7/2001 | Chen et al. | 375/240.03 |
| 6,292,512 B1 * | 9/2001 | Radha et al. | 375/240.1 |
| 6,480,547 B1 * | 11/2002 | Chen et al. | 375/240.27 |
| 6,501,797 B1 * | 12/2002 | van der Schaar et al. | 375/240.12 |
| 6,501,860 B1 * | 12/2002 | Charrier et al. | 382/240 |
| 2001/0024470 A1 * | 9/2001 | Radha et al. | 375/240.1 |
| 2002/0051488 A1 * | 5/2002 | Shipeng | 375/240 |
| 2002/0118750 A1 * | 8/2002 | Yagasaki et al. | 375/240.11 |

* cited by examiner

THE FGS ENHANCEMENT LAYER    PORTION OF THE FGS ENHANCEMENT LAYER TRANSMITTED IN REAL-TIME

HYBRID TEMPORAL-SNR FINE GRANULAR SCALABILITY VIDEO CODING

CROSS REFERENCE TO RELATED APPLICATIONS

The present application claims the benefit of U.S. Provisional Application Serial No. 60/167,067, filed on Nov. 23, 1999.

BACKGROUND OF THE INVENTION

The present invention generally relates to video coding, and more particularly to a fine granular coding technique that includes both quality and temporal scalability.

Fine-granular-scalability (FGS) has been used to compress video for transmission over networks that have a varying bandwidth such as the Internet. Examples of such FGS structures are shown in FIGS. 1A–1B and 2A–2B. As can be seen, these structures consist of a base-layer coded at a bit-rate $R_{BL}$ and a single fine-granular enhancement layer coded at $R_{EL}$. However, in FIGS. 1A–1B, the base layer has been encoded to include just I and P frames, while in FIGS. 2A–2B the base layer has been encoded to include I, P and B frames.

Due to the fine granularity of the enhancement layer, a FGS video stream can be transmitted over any network session with an available bandwidth ranging from $B_{min}=R_{BL}$ to $B_{max}=R_{BL}+R_{EL}$. For example, if the available bandwidth between the transmitter and the receiver is B=R, then the transmitter sends the base-layer at the rate $R_{BL}$ and only a portion of the enhancement layer at the rate $R_e=R-R_{BL}$. As can be seen from FIGS. 1B and 2B, portions of the enhancement layer can be selected in a fin granular manner for transmission. Therefore, the total transmitted bit-rate is $R=R_{BL}+R_e$.

Due to its flexibility in supporting a wide range of transmission bandwidth with a single enhancement layer, the FGS framework has been adopted by the ISO MPEG-4 standard. An example a system utilizing a FGS-based encoder is shown in FIG. 3. The system includes a network 6 with a variable available bandwidth in the range of ($B_{min}=R_{min}$, $B_{max}=R_{max}$). A calculation block 4 is also included for estimating or measuring the current available bandwidth (R). A base layer (BL) video encoder 8 compresses the signal from the video source 2 using a bit-rate ($R_{BL}$) in the range ($R_{min}$, R). Typically, the base layer encoder 8 compresses the signal using the minimum bit-rate ($R_{min}$). This is especially the case when the BL encoding takes place off-line prior to the time of transmitting the video signal. As can be seen, a unit 10 is also included for computing the residual images 12. Further, an enhancement layer (EL) encoder 14 compresses the residual signal with a bit-rate $R_{EL}$, which can be in the range of $R_{BL}$ to $R_{max}-R_{BL}$. It is important to note that the encoding of the video signal (both enhancement and base layers) can take place either in real-time (as implied by the figure) or off-line prior to the time of transmission. In the latter case, the video can be stored and then transmitted (or streamed) at a later time using a real-time rate controller 16, as shown. The real time controller 16 selects the best quality enhancement layer signal taking into consideration the current (real-time) available bandwidth R. Therefore, the output bit-rate of the EL signal from the rate controller equals, $R-R_{BL}$.

SUMMARY OF THE INVENTION

The present invention is directed to fine granular scalability coding technique that includes both quality and temporal scalability. In one example of coding the video data according to the present invention, a portion of the video data is coded to produce base layer frames. Motion compensated residual images are produced from the video data and the base layer frames. The motion compensated residual images are coded using a fine granular coding technique to produce temporal enhancement frames. Further, residual images are generated from the video data and the base layer frames. The residual images are then coded also using a fine granular coding technique to produce quality enhancement frames. The temporal enhancement frames and the quality enhancement frames-also can be combined into an enhancement layer.

In another example of coding video data according to the present invention, a portion of the video data is coded to produce base layer frames. Motion compensated residual images are generated from the video data and the base layer frames. The motion compensated residual images are coded to produce temporal enhancement frames. Residual images are generated from the video data, the base layer frames and the temporal enhancement frames. The residual images are then coded using a fine granular coding technique to produce quality enhancement frames. Further, the temporal enhancement frames form a temporal enhancement layer and the quality enhancement frames form a quality enhancement layer.

In one example of decoding a video signal including a base layer and an enhancement layer according to the present invention, the base layer is decoded to produce video frames. The enhancement layer is also decoded to produce motion vectors. Motion compensation is then performed on the video frames according to the motion vectors to produce additional video frames. The video frames and the additional video frames are the combined into a video sequence. Further, the enhancement layer is decoded to produce enhanced video frames. Each of the enhanced video frames is added to one of the video frames and additional video frames.

BRIEF DESCRIPTION OF THE DRAWINGS

Referring now to the drawings were like reference numbers represent corresponding parts throughout.

DETAILED DESCRIPTION

Fine granular scalability (FGS) coding is implemented to improve the video quality or Signal-to-Noise-Ratio (SNR) of every frame or picture transmitted at the base layer. This is accomplished by computing a residual image (RI) which is the difference between the decoded base-layer image and the original picture. The residual image is then coded using an embedded or a fine granular video coding method. For the purposes of this discussion, the image resulting from this coding process will be referred to as the FGS residual-image (FR).

As an alternative to increasing the video quality (or the SNR measure) of every base-layer video frame, it is desirable, in some cases, to increase the frame-rate of the transmitted video sequence. This can be accomplished by sending additional frames. For example, let it be assumed that a video signal is composed of a 10 frame-per-second (fps) sequence. In the base-layer, only 5 fps of this video sequence (e.g., using frames 1, 3, 5, . . . etc.) is coded and transmitted. The enhancement layer then adds the remainder 5 fps sub-sequence (i.e., coding frames 2, 4, 6, . . . etc.). This type of scalability is known as temporal scalability where the enhancement layer improves the temporal representation of the video sequence by inserting extra frames, which are not coded at the base-layer. This, in general, improves the motion smoothness of the scalable video sequence.

However, the current FGS solution does not support temporal scalability. Based on the existing FGS framework (originally proposed to the MPEG-4 standard and currently serves as the reference draft standard), the base-layer is compressed using a frame-rate $f_{BL}$ at a bit-rate $R_{BL}$. Then regardless of the bandwidth-range (i.e., $B_{min}=R_{BL}$ to $B_{max}=R_{BL}+R_{EL}$) covered by an FGS-based codec, the scalable video sequence has to maintain the frame rate of the base layer (i.e., $f_{BL}$) over the whole bandwidth range ($B_{min}$, $B_{max}$). In other words, the only improvement that can be achieved is by increasing the video quality of the same frame-per-second sequence ($f_{BL}$), as explained above.

In view of the above, the present invention is directed to providing both quality and temporal scalability based on FGS coding. According to the present invention, one way to accomplish this is to utilize a hybrid temporal-quality (i.e., temporal-SNR) scalability structure based on FGS video coding, which will be described in detail below.

Figure 1A:
FIGS. 1A–1B shows one prior art scalability structure.
Figure 1A:
Figure 1A:
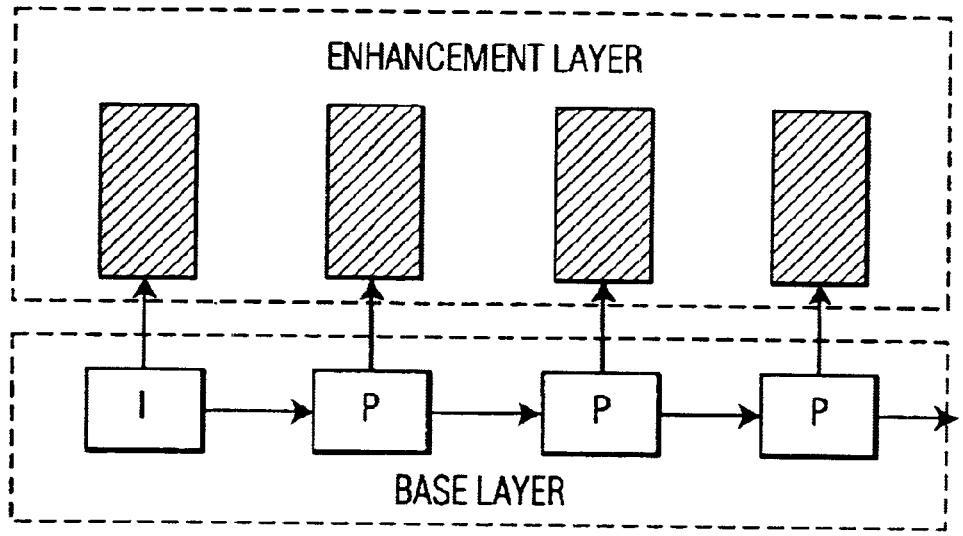
Figure 1B:
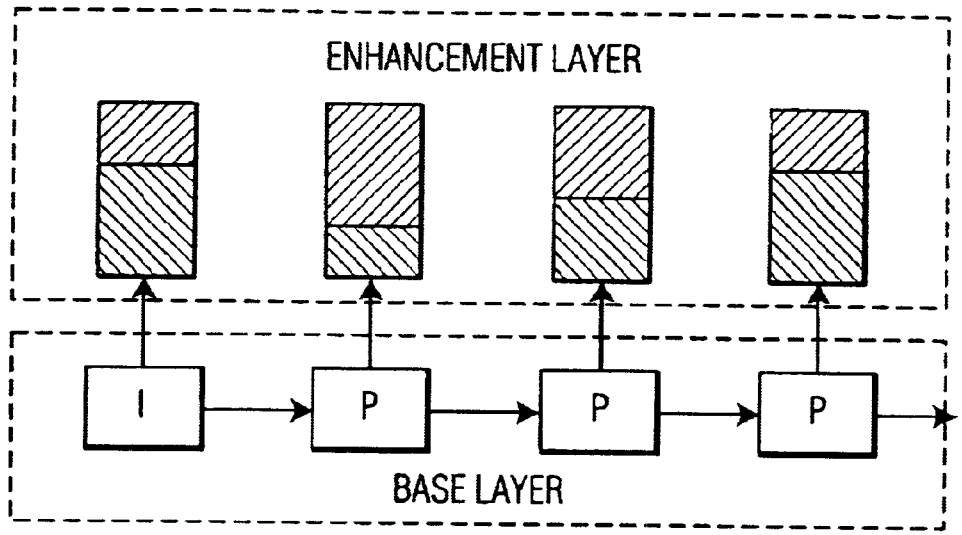
Figure 2A:
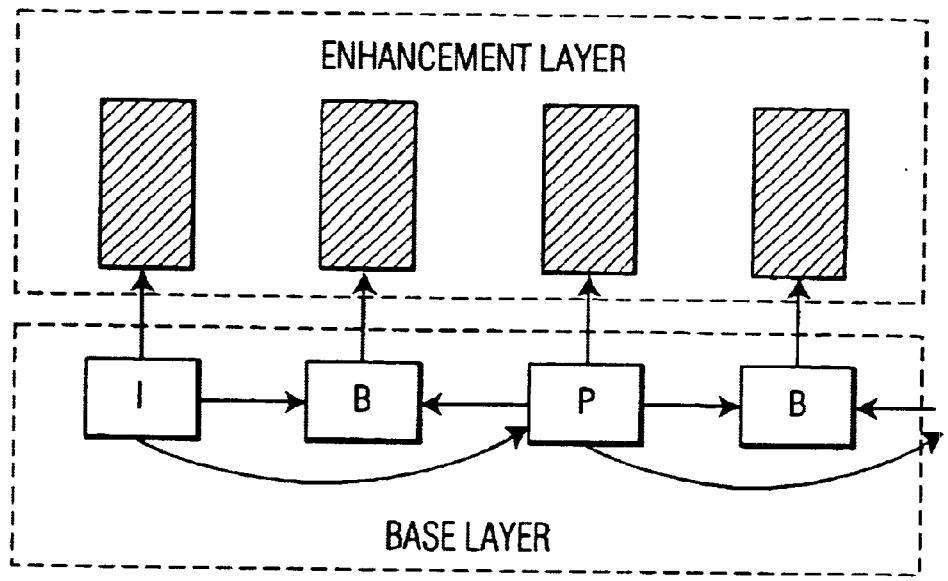
FIGS. 2A–2B show another prior art scalability structure.
Figure 2B:
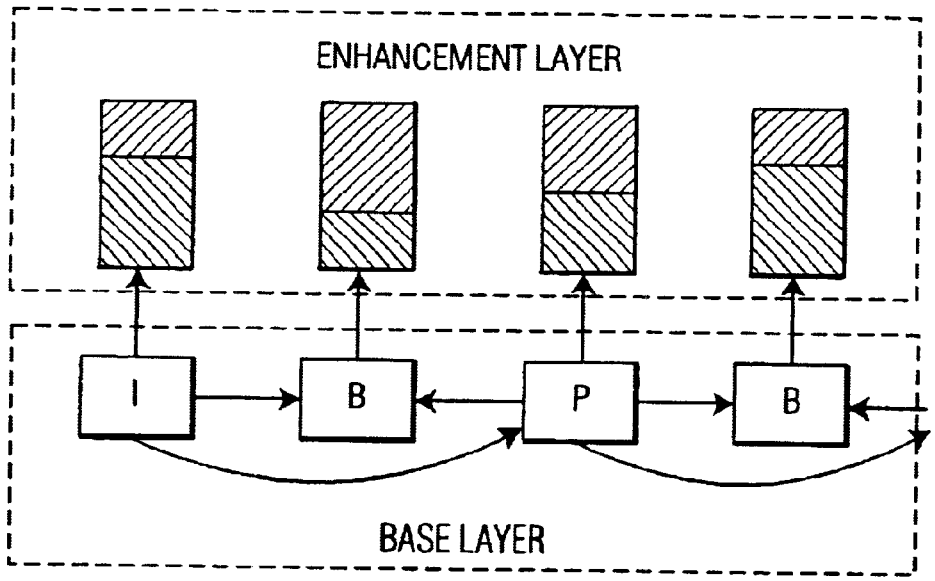
Figure 3:
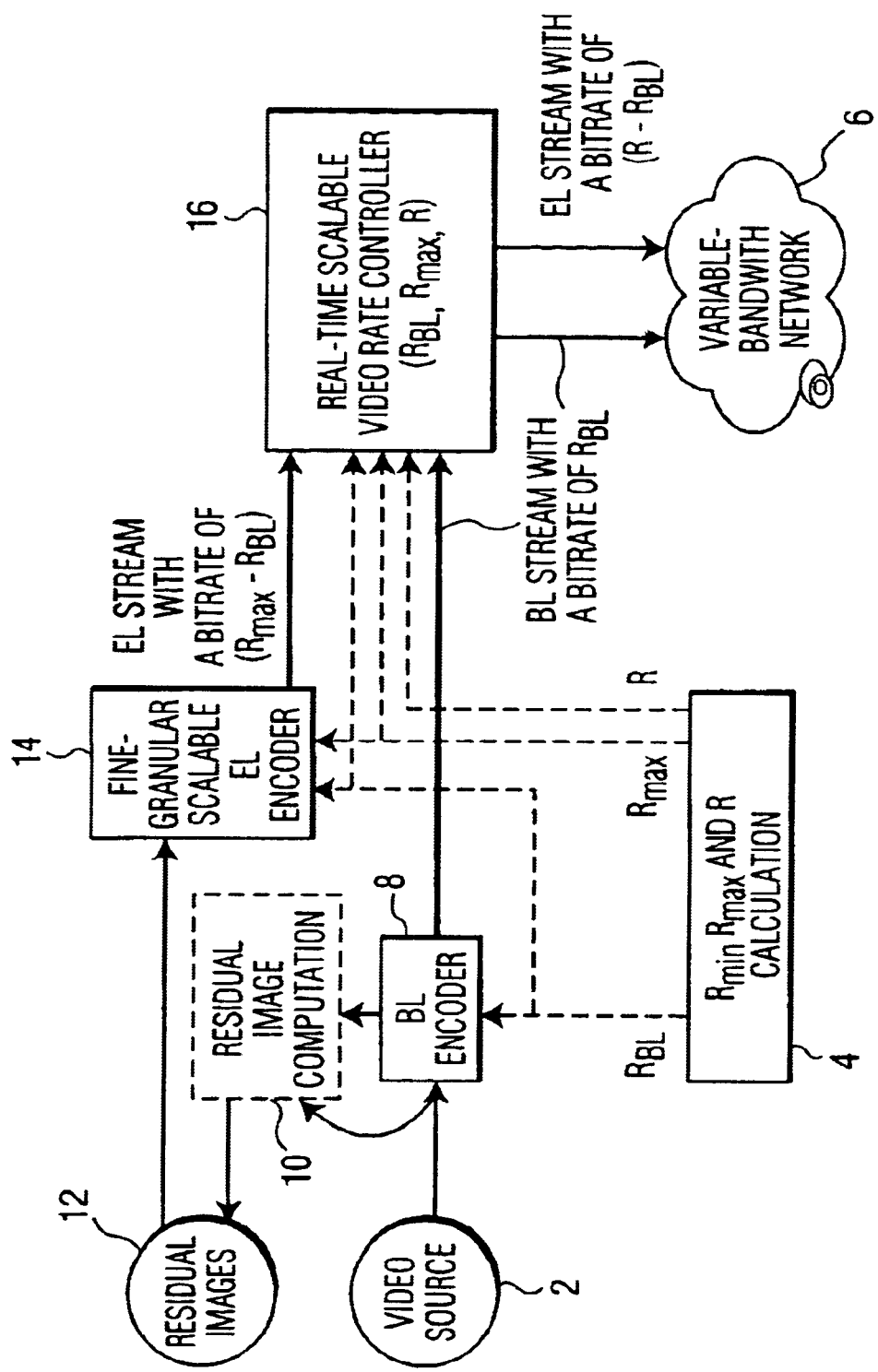
FIG. 3 shows a system utilizing the prior art scalability structure.
Figure 4A:
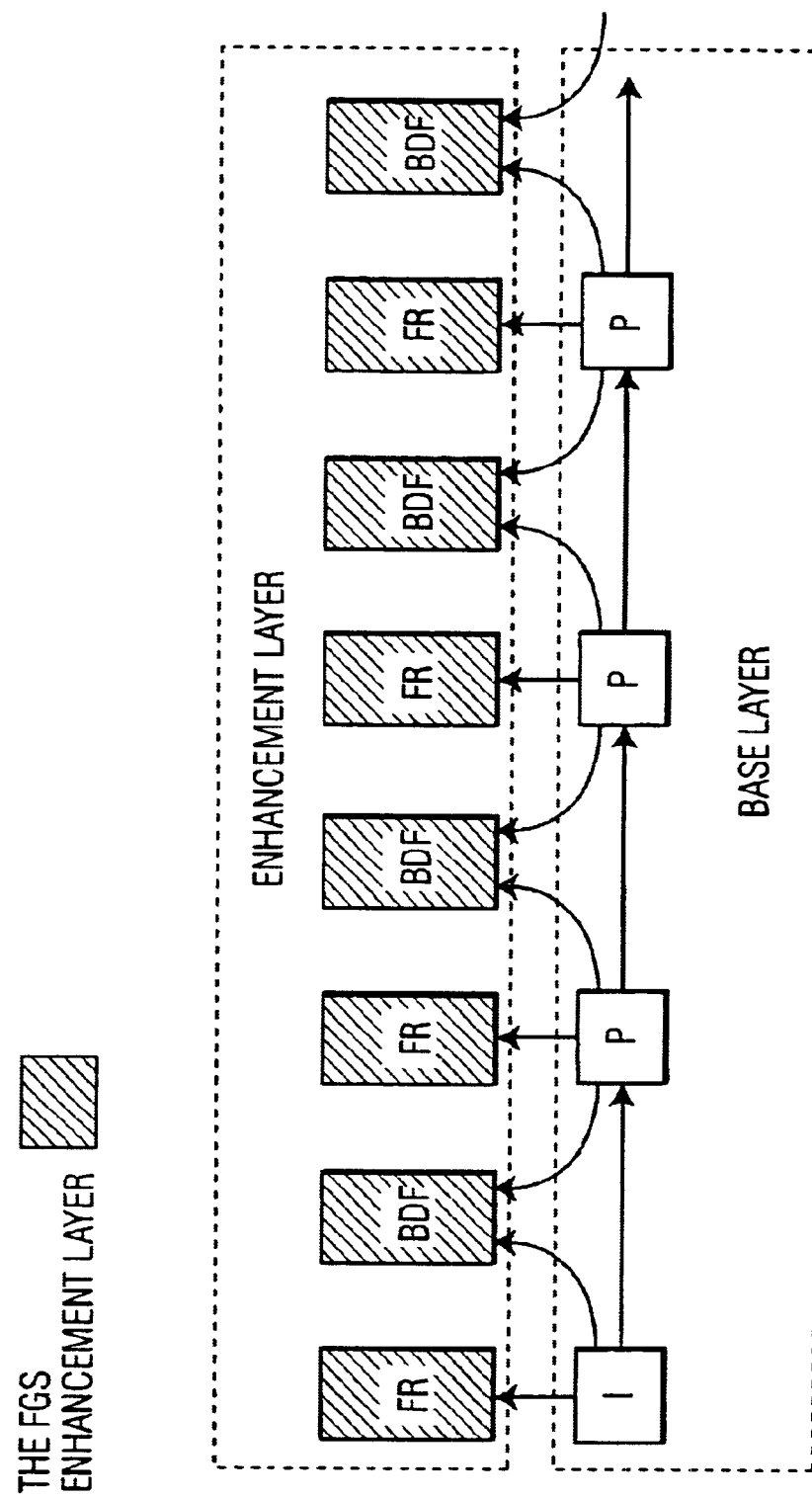
FIGS. 4A–4E show examples of the hybrid scalability structure according to the present invention.

One Example of the hybrid temporal-SNR FGS scalability structure according to the present invention is shown in FIG. 4A. As can be seen, this structure includes a base-layer including I and P frames. However, the enhancement layer includes both a FGS Residual (FR) frames along with a bi-directional FGS (BDF) frames. Utilizing both FR and BDF frames enables the present invention to support both quality and temporal fine granular scalability, respectively.

According to the present invention, the BDF frame is predicted from two temporally adjacent base-layer frames. The residual resulting from this prediction is then coded using a fine-granular coding method. Further, the base layer frames are coded also with a fine-granular method to produce the FR frames. It is important to note that the FGS-based method used for coding the BDF frames may be different or the same from the FGS-based method used for coding the FR pictures.

Figure 4B:
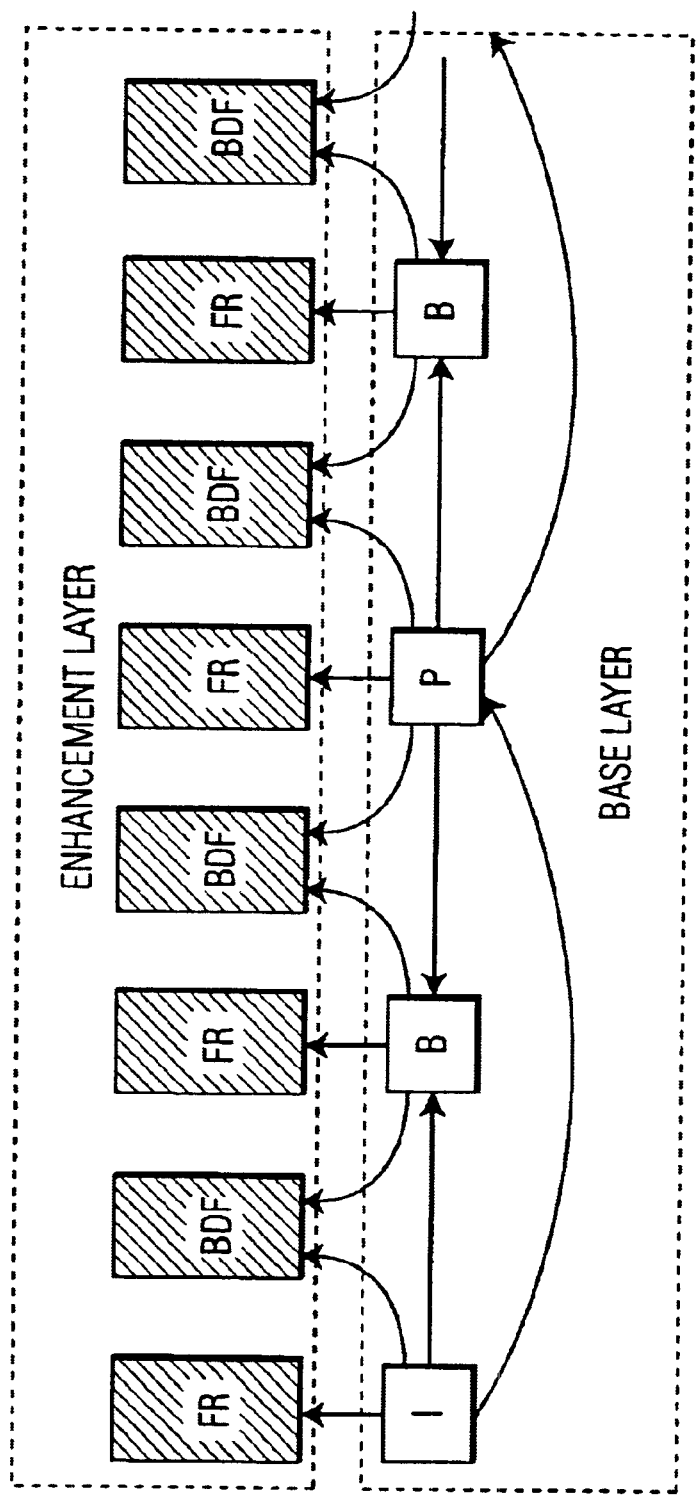

The above-described scalability structure provides the flexibility to support fine-granular quality (i.e., SNR) scalability while maintaining the same frame-rate, temporal (i.e., by increasing the frame-rate only) scalability, or both fine-granular quality and temporal scalabilities. Examples of these different modes of scalability supported under this invention are shown in FIGS. 4C–4E.

Figure 4C:
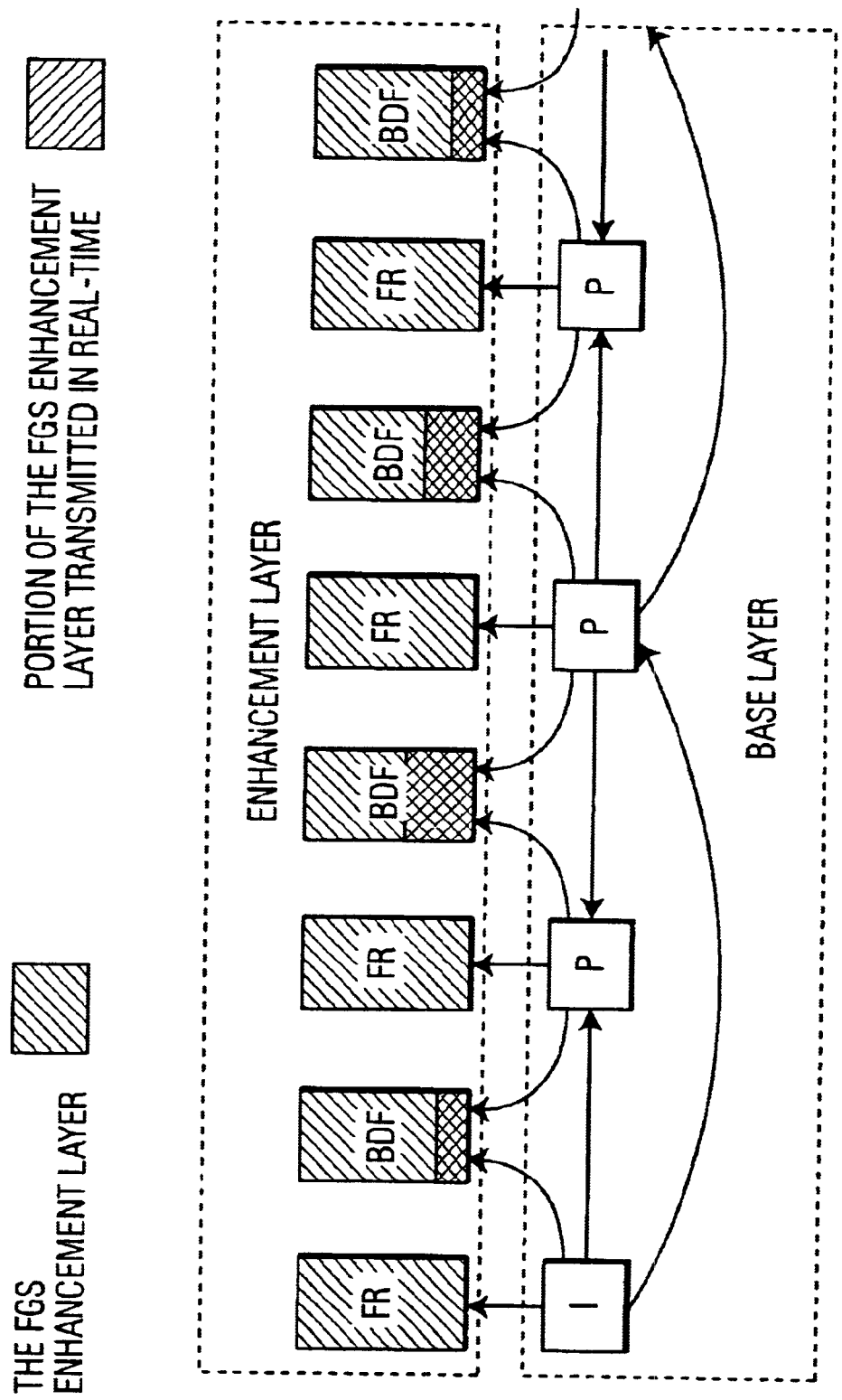
Figure 4D:
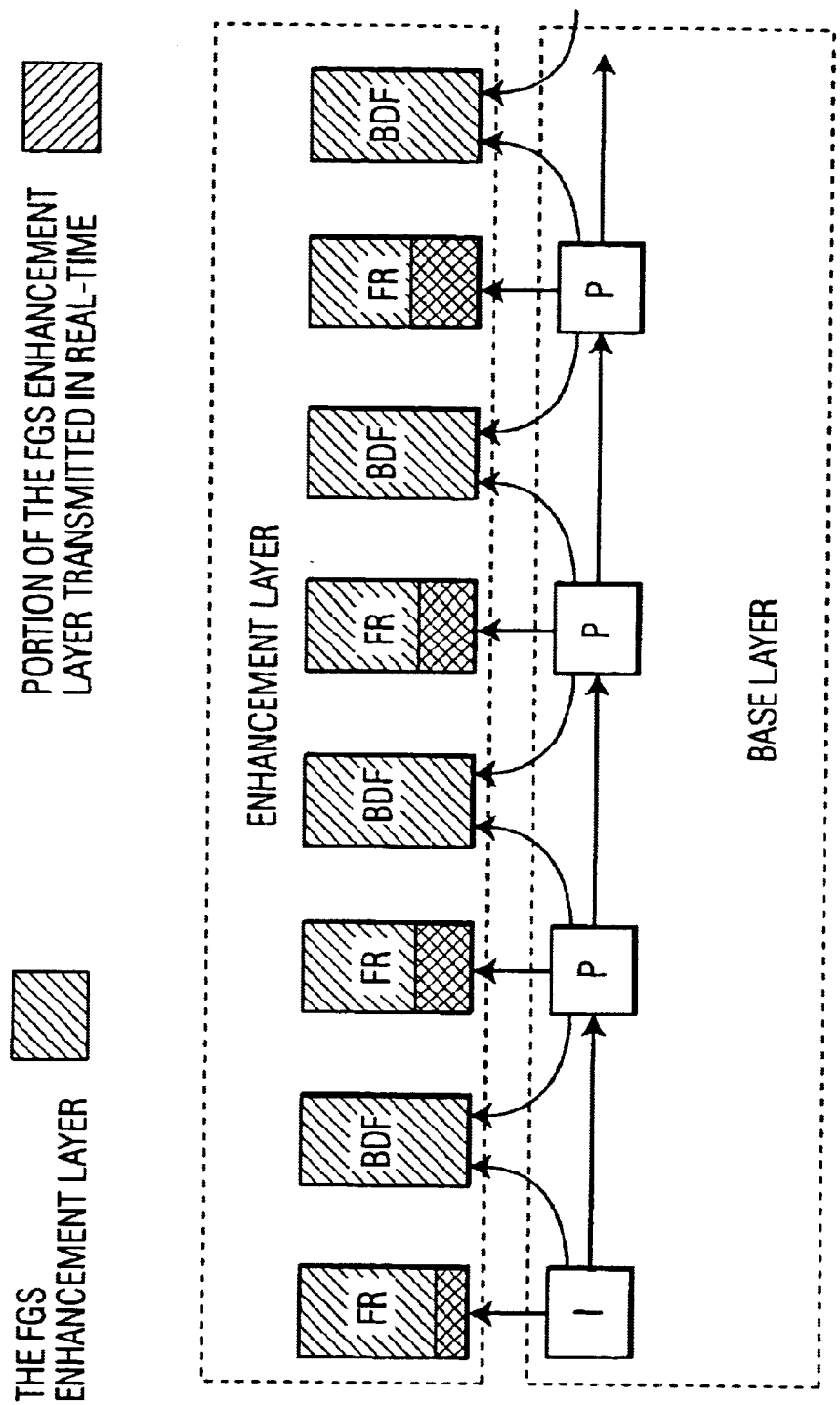
Figure 4E:
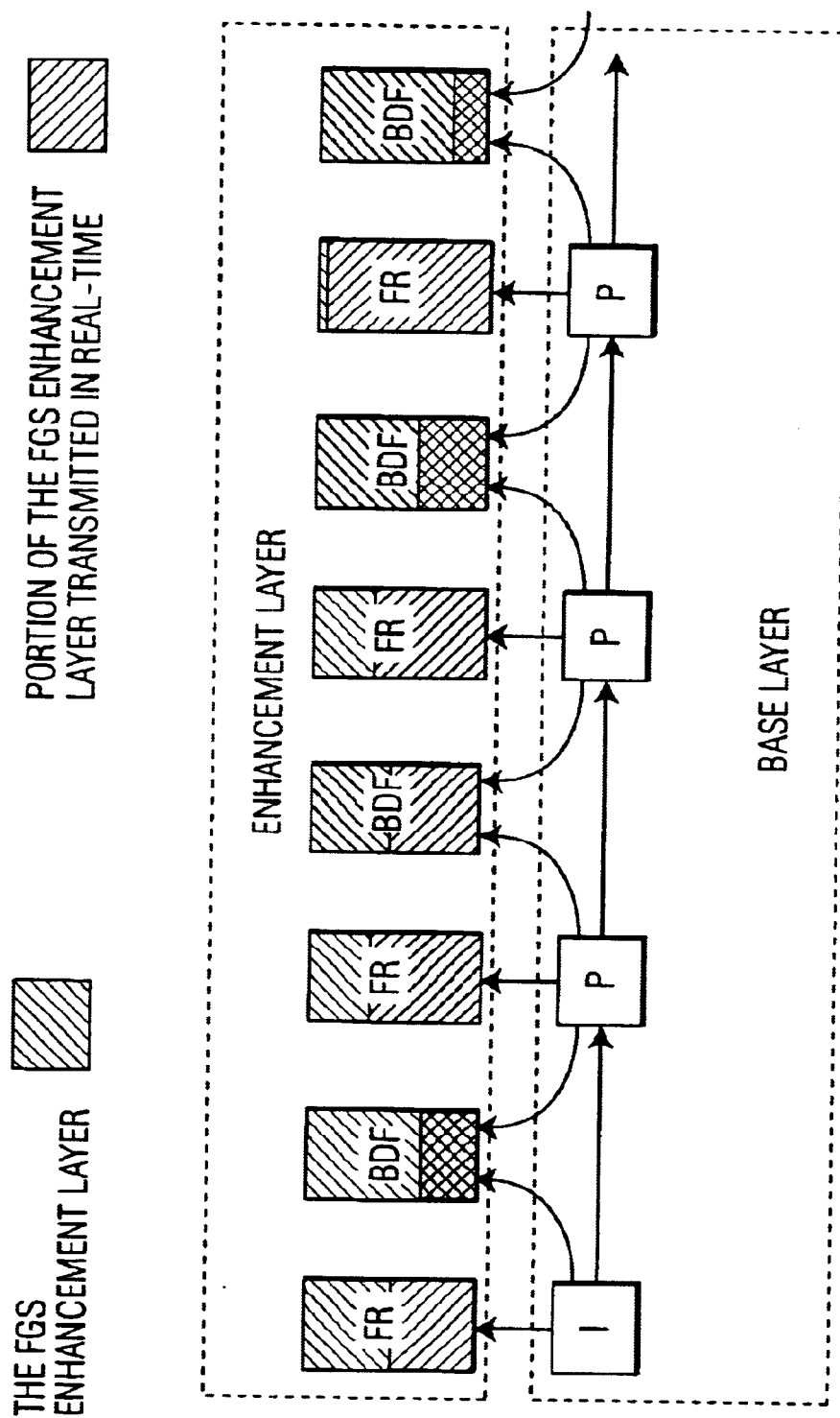

In FIG. 4C, since the BDF frames are only being transmitted in the enhancement layer, temporal scalability is achieved. In FIG. 4D, since the FR frames are only being transmitted, quality (i.e., SNR) scalability is achieved. In FIG. 4E, since both the BDF and FR frames are being transmitted, both quality and temporal scalability is achieved.

Based on the present invention, the frame rate of the FGS enhancement-layer ($f_{EL}$) can be the same or different from the base-layer frame-rate ($f_{BL}$). The total frame-rate ($f_T$) of the combined base and enhancement-layer sequence depends on the number of FR pictures ($N_{FR}$) used in the FGS enhancement-layer relative to the total number of pictures within that layer ($N_{EL}$) as follows:

$$f_T = f_{BL} + ((N_{EL}-N_{FR})/N_{EL}) \cdot f_{EL} \qquad (1)$$

For the example shown in FIG. 4A, the total frame rate ($f_T$) is double the base-layer frame-rate, $f_T=2f_{BL}=f_{EL}$. In general, the proposed scalability structure supports variable frame-rate scenarios where the base-layer and/or enhancement layer frame-rates may vary with time. Furthermore, it is important to note that while the compressed stream generated has a total frame rate $f_T$, the transmitted stream could have a different frame rate $f_t$. For instance, in the examples of FIGS. 4C and 4E, the transmitted stream has a frame-rate of $f_t=f_T$, whereas the example of FIG. 4D the frame rate is $f_t=0.5f_T=f_{BL}$.

Another Example of the hybrid temporal-SNR FGS scalability structure according to the present invention is shown in FIG. 4B. As can be seen, this structure includes the same enhancement layer as the example shown in FIG. 4A. However, this structure differs in that the base layer is coded to include I, P and B frames.

The scalability structure according to the present invention is also capable of supporting different variations of prediction modes from the base layer. The examples shown in FIGS. 4A–4B represent one class of prediction modes, while other modes are shown in FIGS. 5A–5B.

Figure 5A:
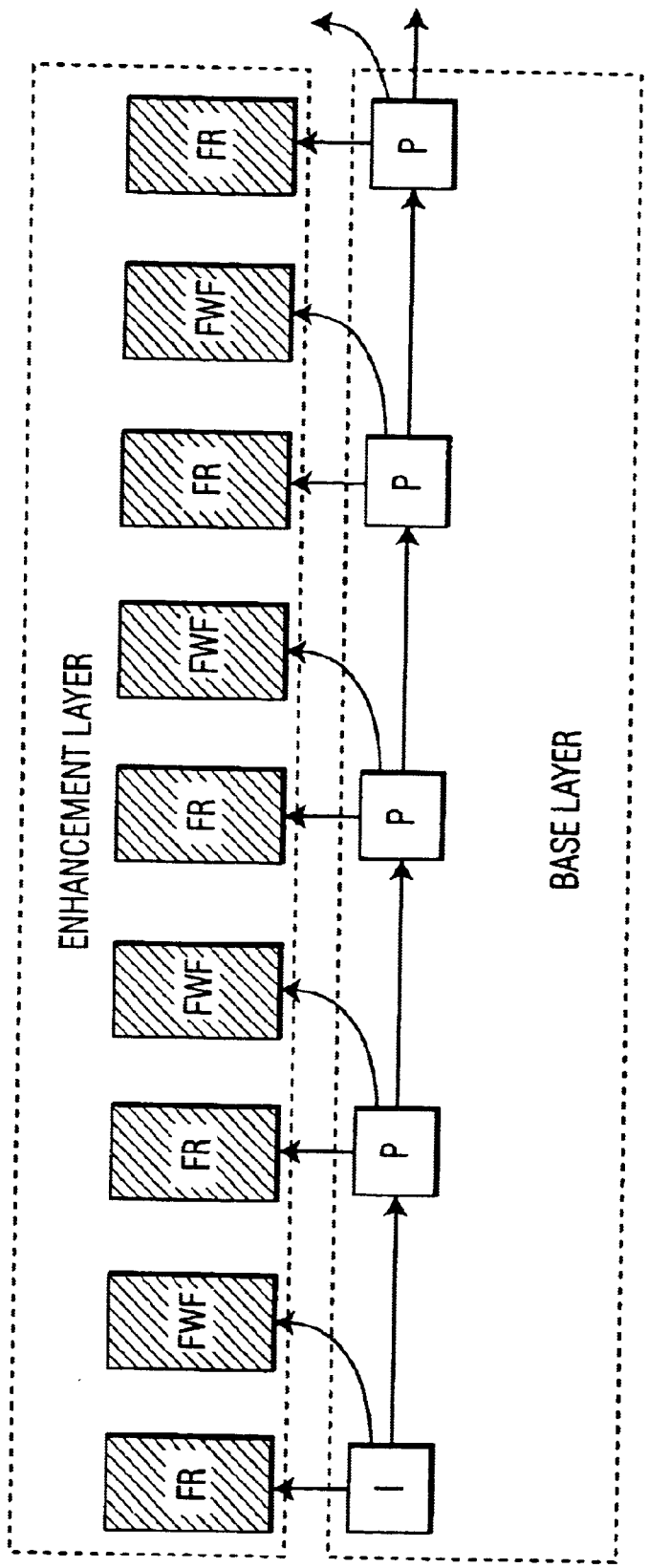
FIGS. 5A–5C show other examples of the hybrid scalability structure according to the present invention.
Figure 5B:
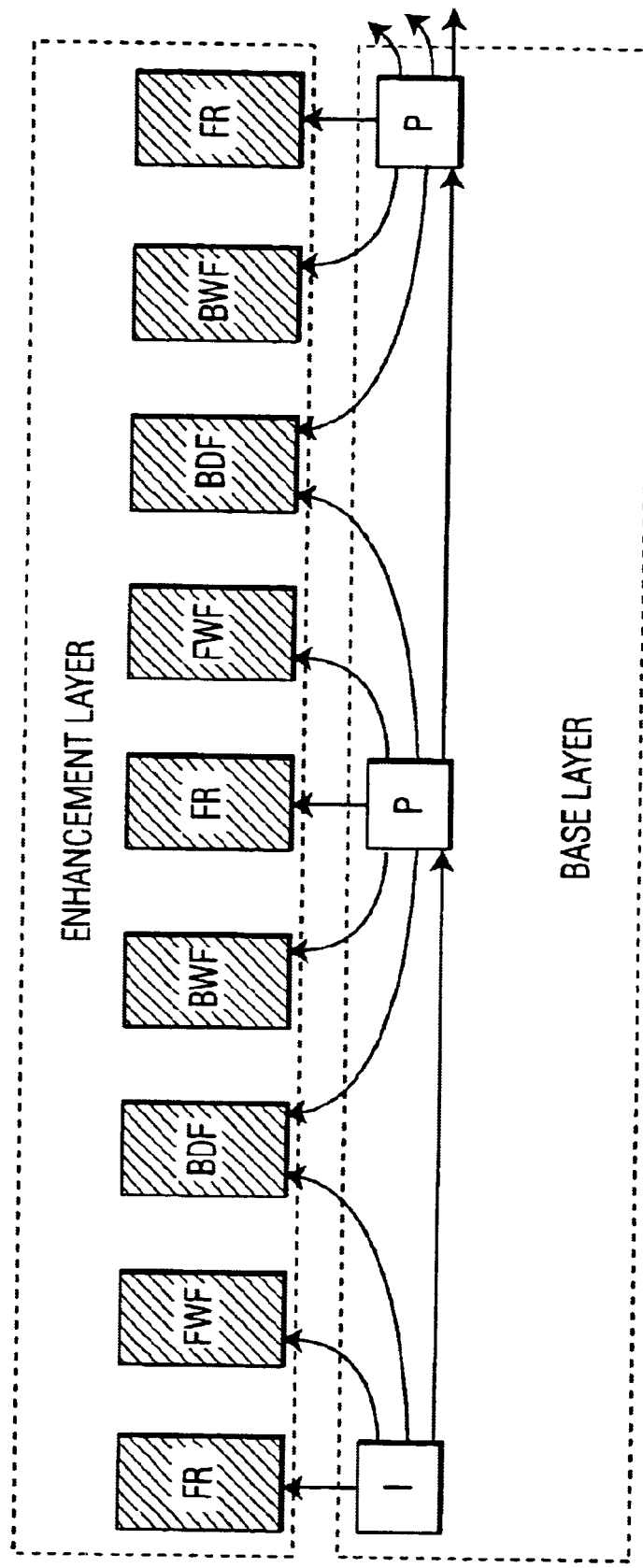
Figure 5C:
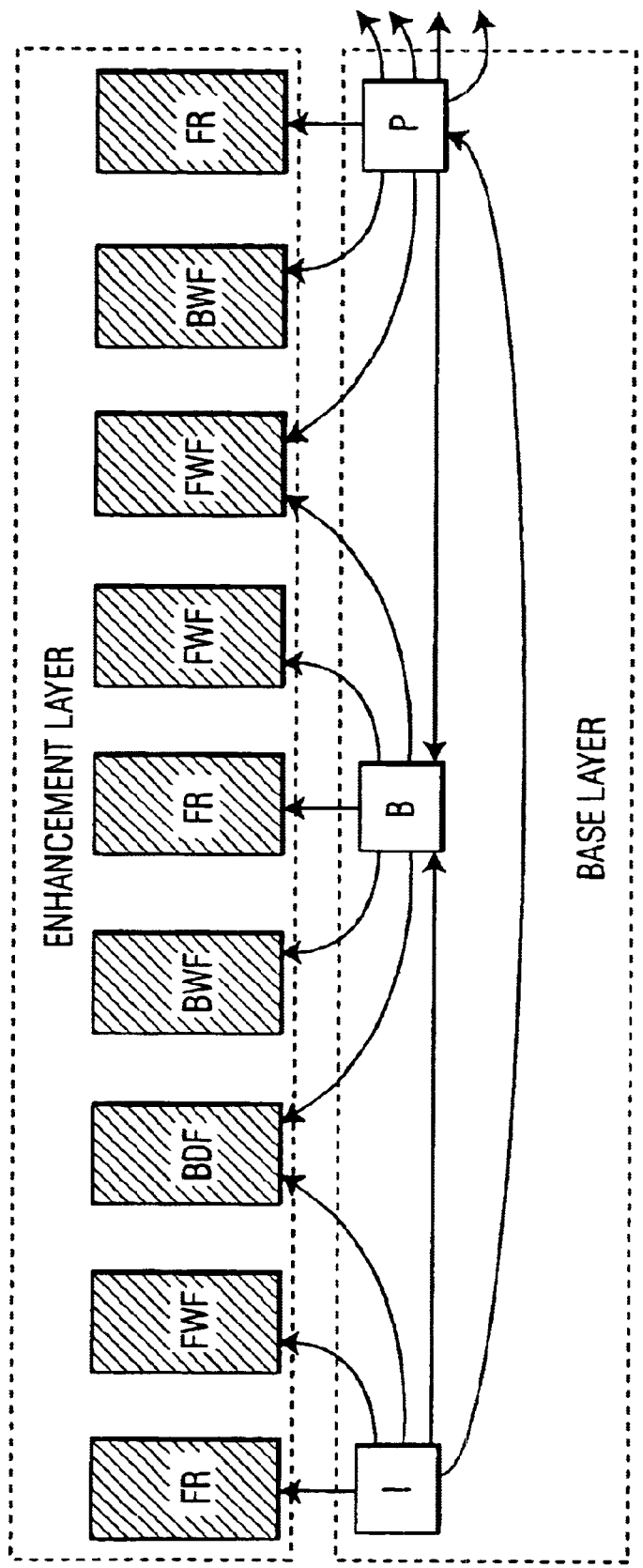

In FIG. 5A, only a forward prediction mode is supported which leads to a simple low-complexity implementation of the video codec. This mode generates a ForWard FGS (FWF) frame type in the enhancement layer, as shown. In FIG. 5B, a backward prediction mode is included to generate BackWard FGS (BWF) frames in the FGS layer. In FIG. 5C, a combination of the backward and forward prediction modes is shown. It should be noted that according to the present invention, combinations of these different FGS-based picture types with different base-layer picture types are also contemplated.

Figure 6:
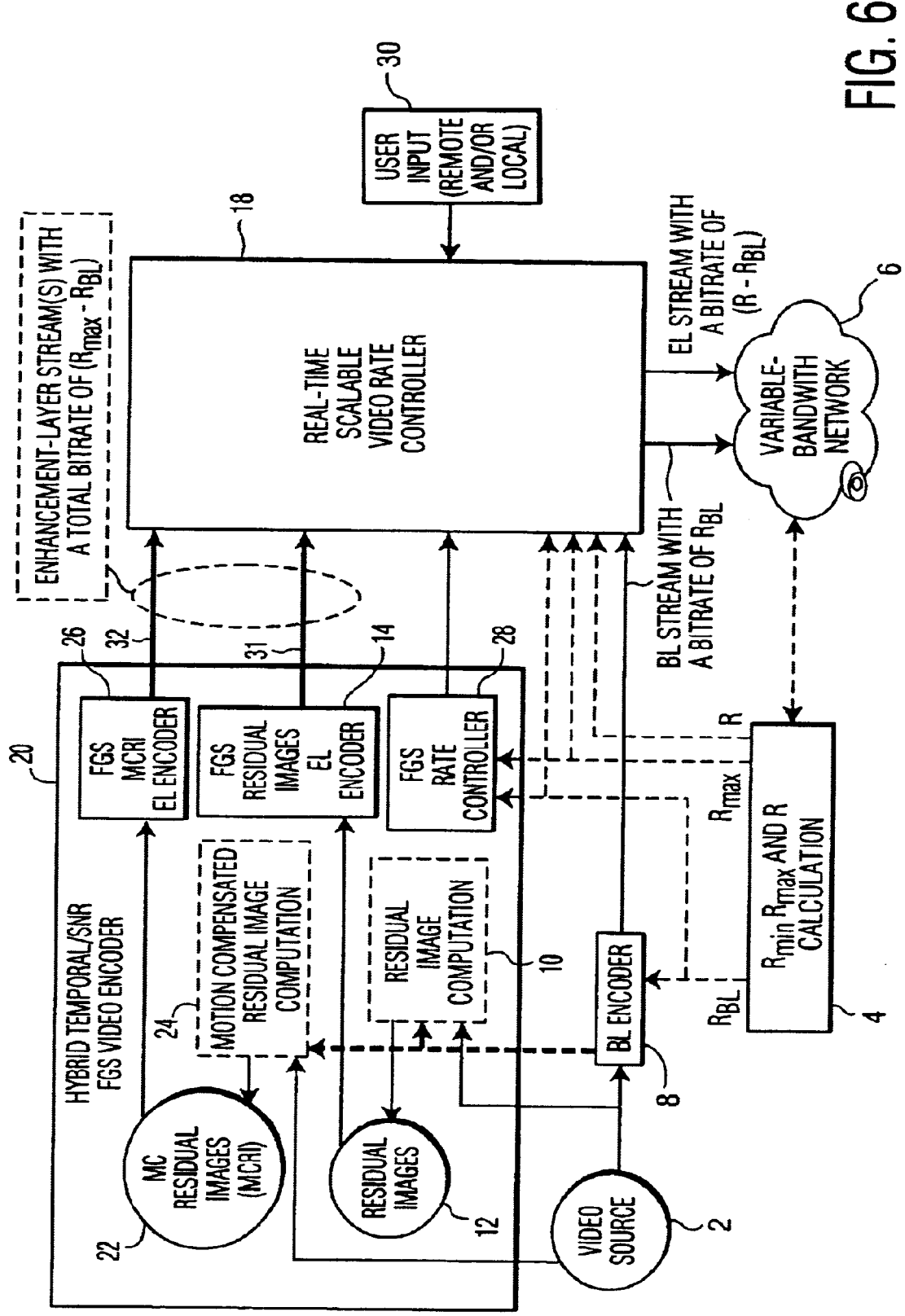
FIG. 6 shows one system utilizing the hybrid scalability structure according to the present invention.

One example of a system employing the hybrid scalability structure according to the present invention is shown in FIG. 6. As can be seen, the system basically includes a video source 2, a variable bandwidth network 6, a base layer (BL) encoder 8 and a hybrid temporal-SNR FGS video encoder 20. According to the present invention, the hybrid temporal-SNR FGS video encoder 20 is capable of being configured to generate any of the enhancement layers shown in FIGS. 4A–4E and 5A–5C. Further, the video source 2 can be embodied by any type of video capturing device such as a digital video camera.

As can be seen from FIG. 6, uncoded video data from the video source 2 is input to both the BL encoder 8 and the hybrid temporal-SNR FGS video encoder 20. The BL encoder 8 codes a portion of the original video data using a standard frame-prediction coding technique. In preferred embodiments of the invention, the BL encoder 8 can be embodied by an MPEG-1, an MPEG-2 or an MPEG-4 encoder.

The BL encoder 8 compresses the video data at a predetermined bit-rate, $R_{BL}$. In preferred embodiments of the invention, $R_{BL}$ is determined by a calculation block 4 based on a current bandwidth of the network 6. More specifically, the calculation block 4 measures a minimum bit-rate ($R_{MIN}$), a maximum bit-rate ($R_{MAX}$), and a current available bandwidth (R) of the network 6. The calculation block 4 then sets $R_{BL}$ to a value between $R_{MIN}$ and R.

In most cases, the calculation block 4 sets $R_{BL}$ to $R_{MIN}$, so as to ensure that, even at its lowest bandwidths, the network 43 will be able to accommodate the video data coded by the present invention. This is especially true in cases where base layer encoding takes place off-line.

The original video data from the source 2 and the coded video data (i.e. the base layer) provided by BL encoder 8 are provided to both the residual image (RI) computation block 10 and motion compensated residual image (MCRI) computation block 24 in the hybrid encoder 20. The RI computation block 10 and MCRI computation block 24 use the original video data and the coded video data to generate the residual images 12 and motion compensated (MC) residual images 22, respectively as described below.

During operation, the RI computation block receives coded video data from BL encoder 8 and then decodes that coded video data. Thereafter, residual images 12 are generated based on a difference between pixels in this decoded video data and pixels in the original video data. Generally speaking, the residual images correspond to the difference between frames in the base layer (which comprises the minimum number of frames and/or the minimum amount of data required by a decoder to decode a video signal) and frames in the original video data.

The RI computation block 10 may use one or more of variety of different methods to generate residual images 12. For example, a simple pixel-by-pixel subtraction could be performed between frames in the base layer and frames in the original video data. The resulting difference between these two sets of frames (i.e., the residual images) includes differences in the frame resolution. In cases, where the base layer does not include entire frames of the original video data, the residual images include these missing frames.

The residual images 12 also could be generated by first filtering the decoded video data and then determining a difference between this filtered video data and the original video data. This technique has the advantage of removing unwanted noise and the like from the decoded video data caused, e.g., by the coding and decoding processes. In preferred embodiments of the invention, a de-blocking filter is used to filter the decoded video data, although the invention is not limited to the use of this type of filter.

Another technique to generate the residual images 12 includes filtering both the decoded video and the original video data, and then determining a difference between both of these types of filtered data. In this technique, the same type of filter (e.g., a de-blocking filter) may be applied to both the original video data and the decoded video data. Alternatively, different types of filters may be applied to the original video data and to the decoded video data.

As described above, the residual images 12 are computed in the pixel domain. For example, if the base-layer encoder uses a DCT transform-based encoding and the enhancement-layer encoder uses a wavelet transform-based encoding, then the base-layer picture has to be subtracted from the original image (pixel-by-pixel) in the original (i.e. not transform) pixel domain. This requires that the base-layer picture compressed bit-stream be decoded to generate its pixel domain representation prior to computing the residual signal. This decoding process usually takes place in the base-layer decoder (for the purpose of base-layer motion estimation and compensation), and therefore the enhancement-layer decoder can take advantage of that. The resulting pixel-domain residual then has to be transformed into the desired transform-domain (e.g. wavelet) prior to performing the FGS coding of this residual.

However, if both the base-layer and enhancement-layer encoders use the same transform, then the residual images 12 can be computed in the transform-domain (e.g. DCT or wavelet domain). In this case, the FGS encoder codes the resulting transform directly (i.e. without the need for performing any transform operation on the residual signal since it is already in the desired transform-domain).

Also during operation, the MCRI computation block 24 receives coded video data from BL encoder 8 and then decodes that coded video data. Thereafter, the MC residual images 22 are generated based on a motion-compensation approach from the decoded video data. This can be achieved, for example, by using motion-estimation-based approaches for computing a motion-compensation picture. This motion-compensation picture is then subtracted pixel-by-pixel from the corresponding original picture in the pixel domain. The resulting pixel-domain residual is then transformed prior to its coding by the fine-granular encoder.

It is important to note that although the residual images 12 can be computed directly in the transform domain (e.g. when both the base-layer and enhancement layer use the same transform), the MC residual images 22 are computed in the pixel domain. Therefore, the MC residual images 22 (pixel-domain) have to be transformed (e.g. DCT) prior to fine-granular-based coding.

The Hybrid encoder 20 also includes a FGS MCRI enhancement layer (EL) encoder 26 and a FGS residual image EL encoder 14. During operation, the FGS MCRI EL encoder 26 and a FGS residual image EL encoder 14 respectively code the MC residual images 22 and residual images 12 using an embedded fine-granular coding technique.

It should be noted that according to the present invention any fine-granular coding technique can be used in conjunction with the proposed scalability structure for coding the MC residual images 22 or the residual images 12. Prime candidates for coding either type of these residual pictures are embedded DCT-based mechanisms (foe example bit-plane embedded DCT-based mechanisms) and the family of embedded zero tree wavelet methods. Other fine-granular coding methods can also be applied such as a scalable matching pursuit based on an over-complete set of transform functions, etc. Further, it should be noted that the same or a different technique can be used to code the MC residual images 22 and the residual images 12.

As a result of the above coding, two streams of enhancement layer frames are produced including a temporal enhancement stream 32 and a FGS enhancement stream 31. The temporal enhancement stream 32 includes the compressed FGS temporal frames (i.e., MCRI) from the MCRI EL encoder 26 and the FGS enhancement stream 31 includes the SNR (i.e., standard FGS residual) frames from the residual image El encoder 14. These two streams 31,32 can be combined to produce a single FGS enhancement layer stream or can be maintained as two separate streams. Either case, the resulting FGS stream(s) can be stored or transmitted in real-time.

In other words, and similar to the standard FGS case, under the hybrid structure according to the present invention, the coding of the video signal (both enhancement and base layers) can take place either in real-time (as implied by the figure) or off-line prior to the time of transmission. In the second case, the video can be stored and then transmitted (or streamed) at a later time.

However, under either scenario (i.e., real-time encoding or off-line non-real time encoding), a real time scalable video rate controller 18 is included to determine in real time the bit-rates that should be allocated for transmitting the enhancement layer frames. This allocation is performed based on inputs from the calculation block 4, FGS rate controller 28 and user input 30. In performing this allocation, the video rate controller 18 utilizes the inputs R, $R_{BL}$ and $R_{MAX}$ from the calculation block 4 to determine the available bandwidth left to transmit the enhancement layer frames (R–$R_{BL}$). Further, the FGS rate controller 28 also decides on the bit-rate allocation between the two enhancement layer streams 31,32 based on the inputs R, $R_{BL}$ and $R_{MAX}$. Further, the user input 32 would enable a user to select a preference for quality and/or temporal scalability.

After the bit rate for transmitting the enhancement layer frames is selected, the real-time scalable video rate controller 18 then selects portions of the enhancement layer frames to be transmitted. The portions of enhancement layer frames selected can be either frames from one or both of the two enhancement layer streams 31,32. As described above, this selection also can be controlled by the user input 30. For example, if a user prefers just quality scalability, the real-time scalable video rate controller 18 will only select frames from the FGS enhancement stream 31. After this selection, the real-time scalable video rate controller 18 outputs images to the variable-bandwidth network 43 as a BL stream and an EL stream.

Figure 7:
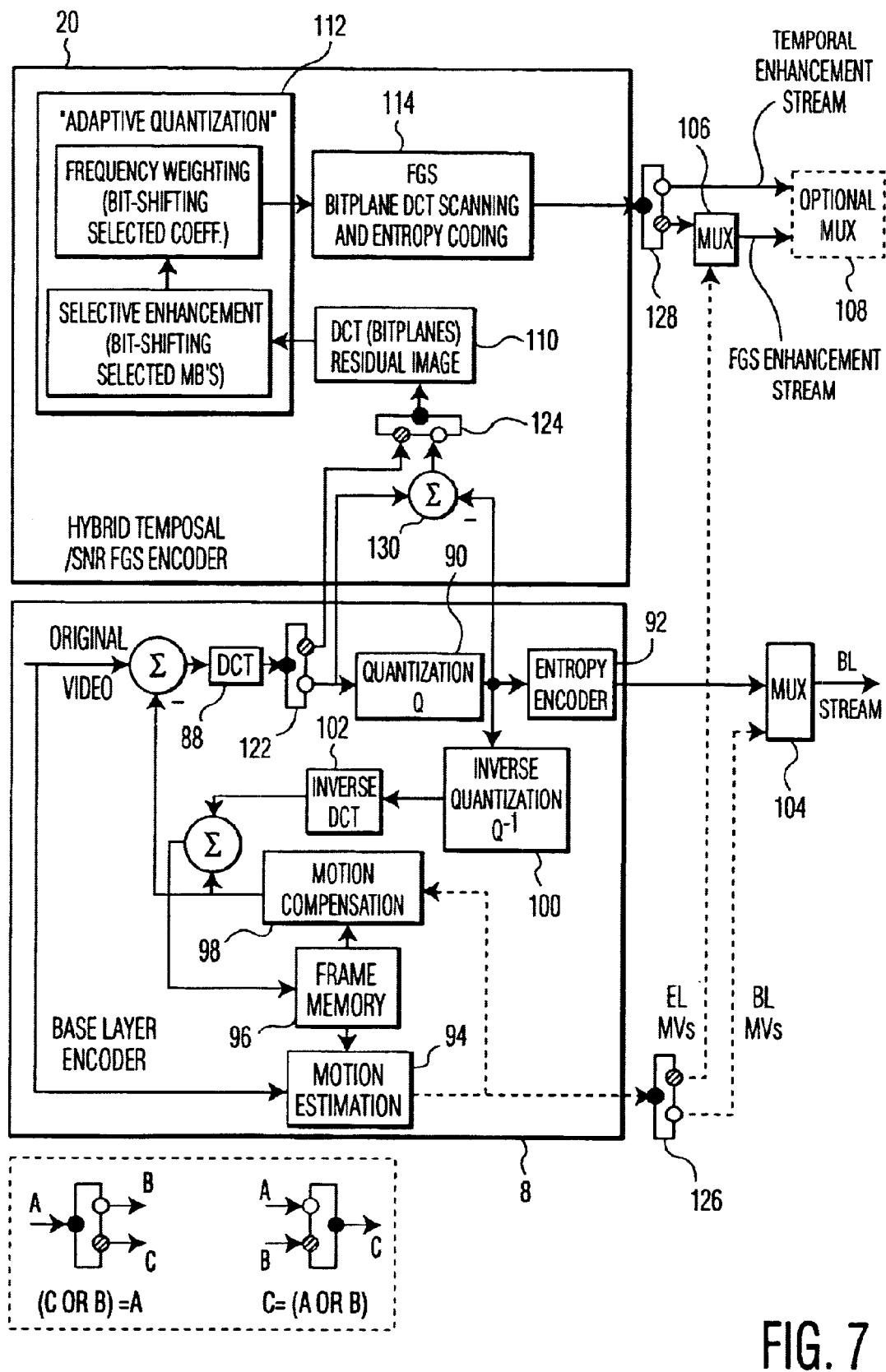
FIG. 7 shows one example of a functional architecture for the video encoders of FIG. 6.

FIG. 7 shows one example of a functional architecture for the base layer encoder 8 and the Hybrid Temporal/SNR FGS video encoder 20 of FIG. 6. Although FIG. 7 shows the encoding operation based on the DCT transform, other transforms (e.g. wavelet) c an also be used. This architecture illustrates that despite the additional computations needed for coding the temporal enhancement frames when compared with the standard FGS picture coding, these additional computations can be realized without an extra complexity overhead.

As can be seen in FIG. 7, the base layer encoder 8 includes a DCT block 88, a quantization block 90 and a entropy encoder 92 that generates part of the BL stream from the original video. Further, the base encoder 8 also includes the motion estimation block 94 that produces two sets of motion vectors from the original video. One set of motion vectors corresponds to the base-layer pictures, while the other set corresponds to the temporal enhancement frames. A multiplexer 104 is included to multiplex the base layer motion vectors with the BL stream. Another multiplexer 106 is also included to multiplex the motion vectors corresponding with the temporal enhancement stream. Moreover, the two enhancement-layer streams can be either multiplexed by an optional third multiplexer 108 to generate a single stream (which consists of both SNR and temporal FGS pictures) or stored/transmitted in two separate streams.

As can be further seen, the base layer encoder 8 also includes an inverse quantization block 100, an inverse DCT block 102, motion-compensation block 98 and frame-memory 96. These functional blocks from the base layer encoder 8 all are utilized when computing the enhancement layer MC residual images. As can be seen, this is achieved through a novel (yet simple) data-flow control of the data within the overall codec architecture. What makes this sharing of resources feasible is the fact that the encoder never compresses a base-layer frame and a temporal enhancement frame at the same instance.

This data flow control is achieved through functional blocks 122,124, 126,128. For example, one functional block 122 controls the output of the DCT block 88 by forwarding its output to either the quantization block 90 if a base layer frame is being coded or to another functional block 124 if a FGS enhancement layer MC residual image is being coded.

As can be seen, the Hybrid temporal/SNR FGS encoder 20 includes a DCT residual image block 110 for storing the residual images and MC residual images. A residual image is generated by a subtracter 130 that subtracts the output from the input of quantization block 90. Further, a MC residual image is directly generated at the upper output of the functional block 122.

The hybrid encoder 20 also includes adaptive quantization (AQ) coding tools 112, which can be applied to both the residual images and the MC residual images. A good candidate for the AQ tools 112 are the ones defined by the FGS MPEG-4 standard including bit-plane shifting through Selective Enhancement and/or Frequency Weighting.

A FGS entropy coding block 114 is also included to code the residual images and the MC residual images to produce the temporal enhancement stream and FGS enhancement stream. This coding can be performed according to the same techniques described in conjunction with FIG. 6. As can be seen, the coding block 114 is used for both the FGS and temporal enhancement frames since both of these picture types are never compressed at the same instance of time.

Figure 8A:
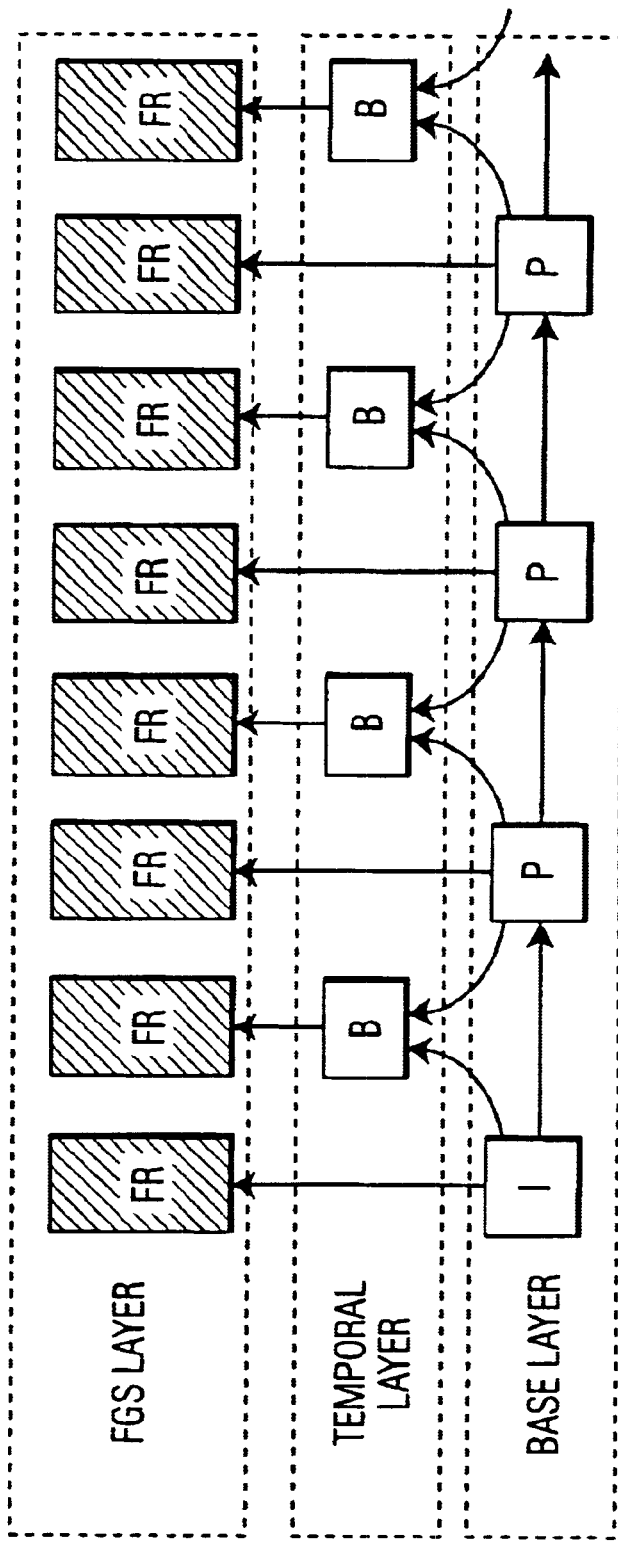
FIGS. 8A–8D show another example of the hybrid scalability structure according to the present invention.

Another Example of the hybrid temporal-SNR FGS scalability structure according to the present invention is shown in FIG. 8A. As can be seen, two enhancement layers are used to achieve the hybrid temporal-SNR scalability in this example. In this case, a temporal layer is used to achieve the temporal enhancement for the base-layer (i.e., better motion), while the FGS layer is used to improve the quality SNR of the base-layer and/or the temporal-scalability enhancement layer.

Figure 8B:
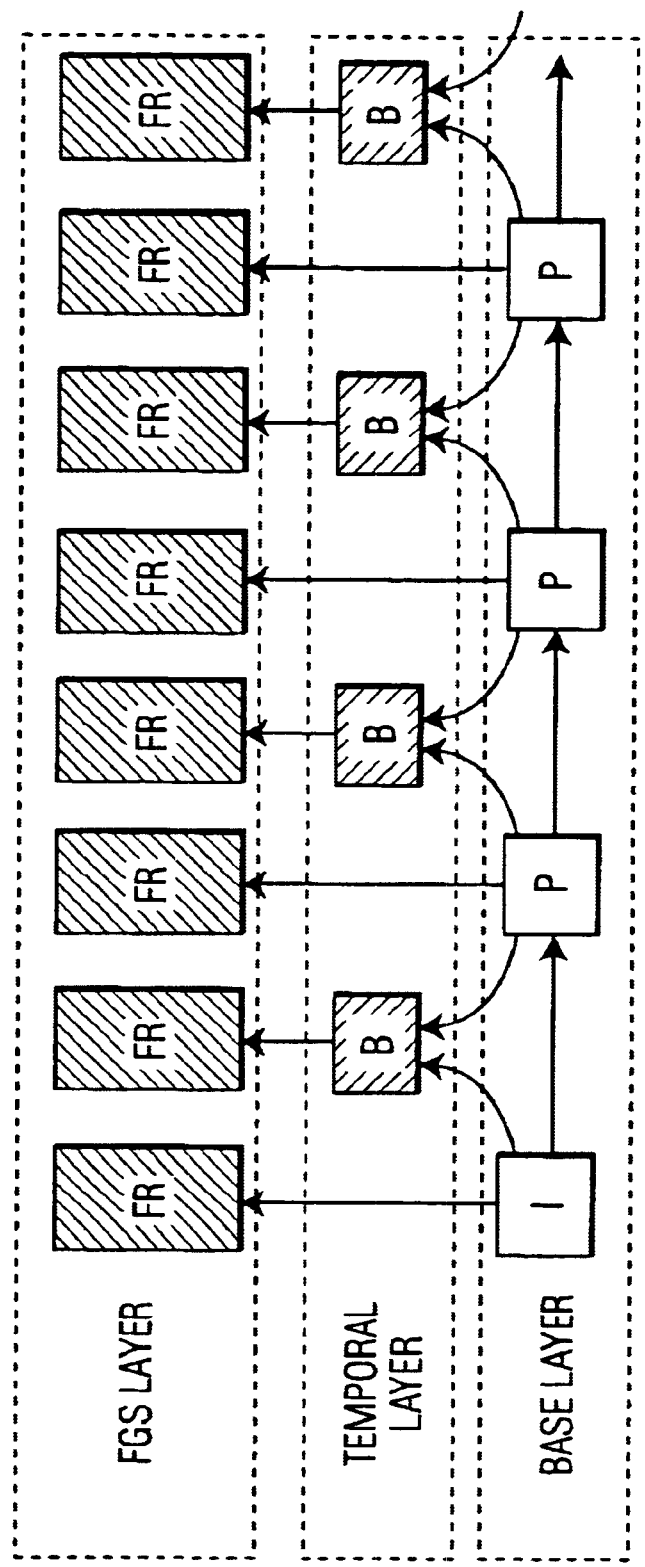
Figure 8C:
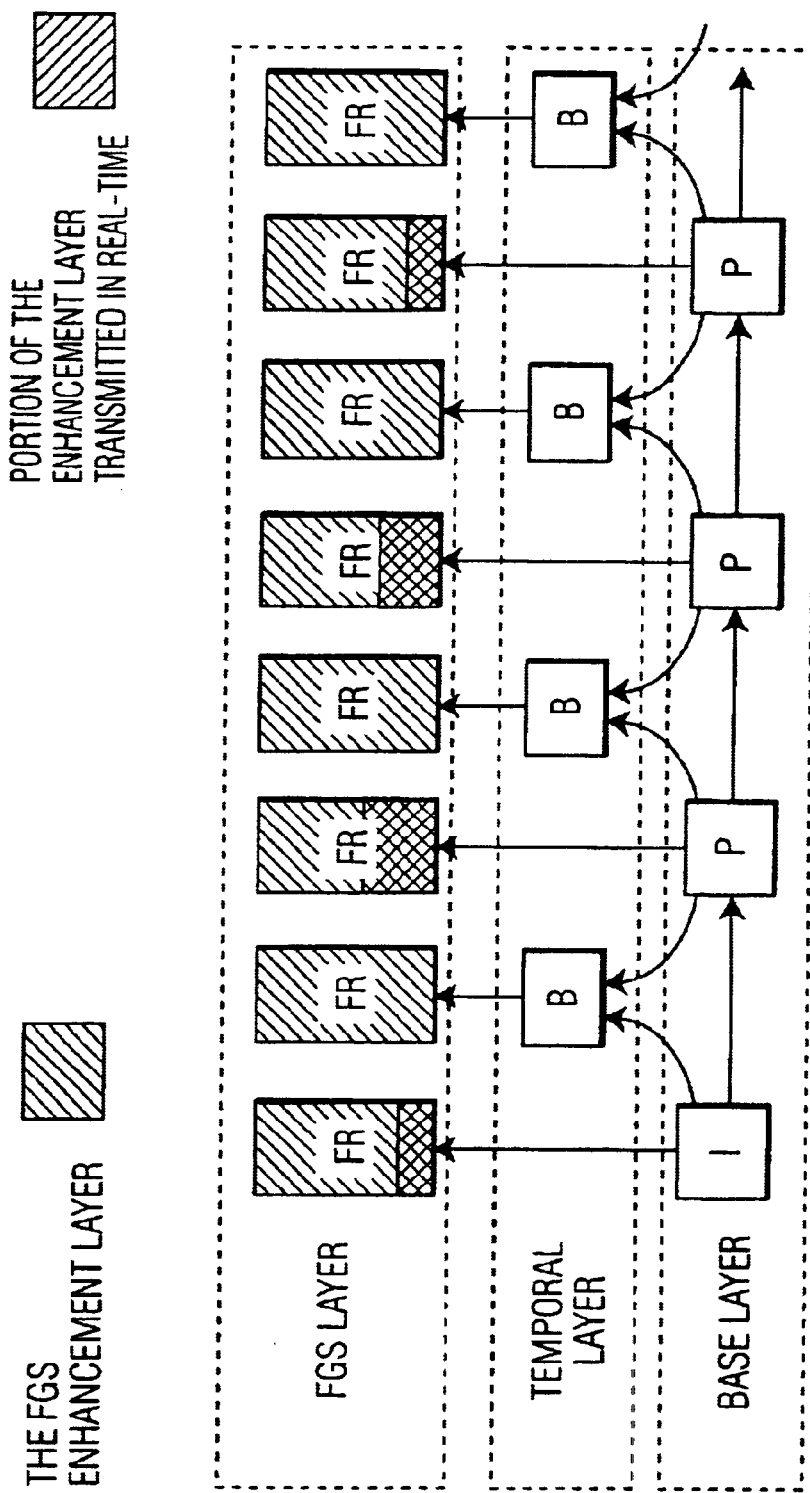
Figure 8D:
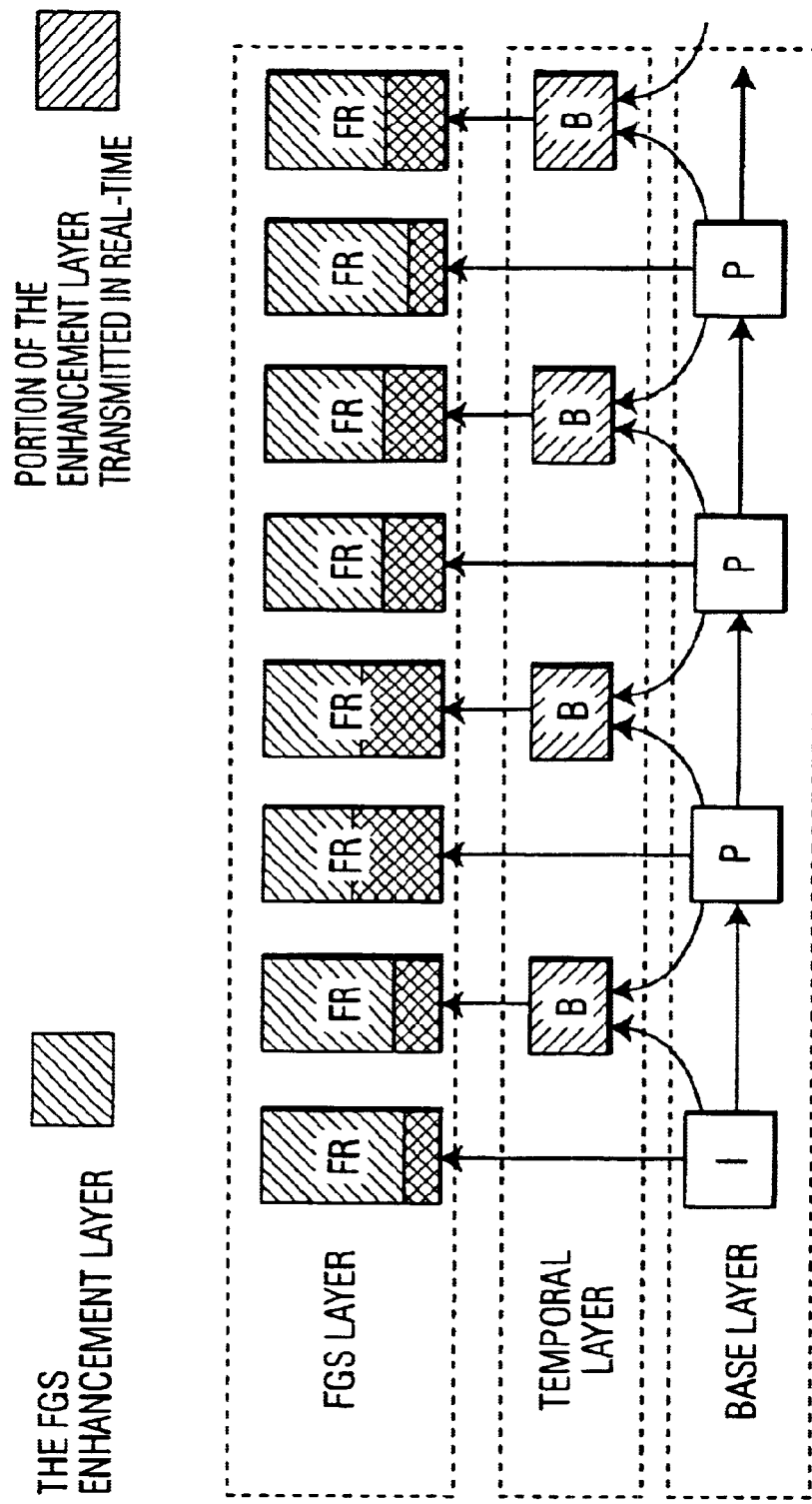

The scalability structure of FIG. 8A also provides the capability of performing temporal enhancement only, SNR enhancement only, or both temporal/SNR enhancements, as shown in FIGS. 8B–8D. In FIG. 8B, since only the temporal layer frames are transmitted, temporal scalability is achieved. In FIG. 8C, since only the FGS frames corresponding to the base layer frames are transmitted, quality (i.e., SNR) scalability is achieved. In FIG. 8D, since both the temporal and FGS layer frames are being transmitted, both quality and temporal scalability is achieved.

In regard to the hybrid temporal-SNR FGS scalability structure of FIG. 8A, it should be noted that other modifications are contemplated. For example, the temporal layer frames are not limited to bi-directional predicted frames. According to the present invention, the temporal layer frames also can either be only forward predicted or backward predicted, or any combination of thereof.

Figure 9:
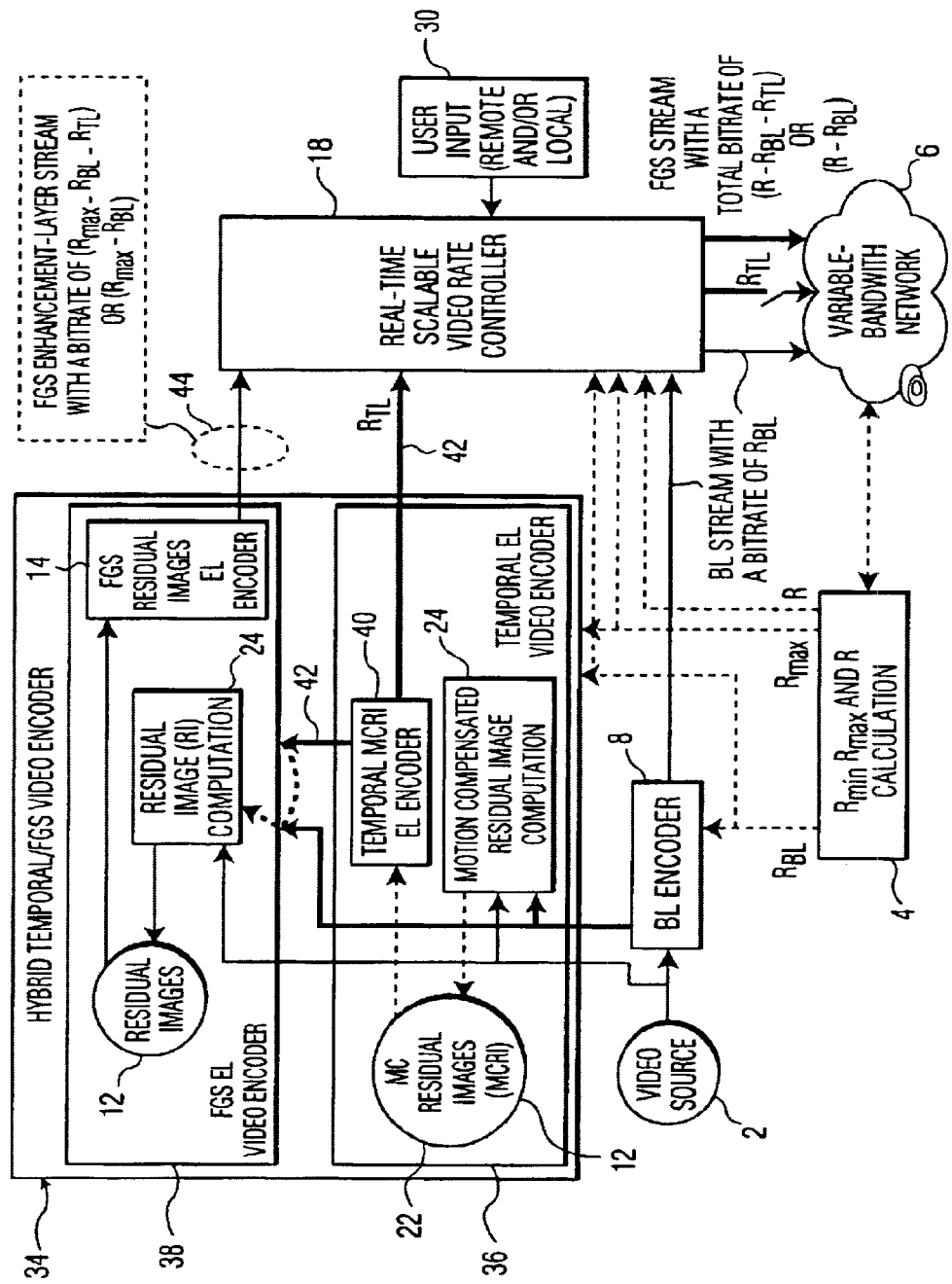
FIG. 9 shows another system utilizing the hybrid scalability structure according to the present invention.

Another example of a system employing the hybrid scalability structure according to the present invention is shown in FIG. 9. This example is similar to the example of FIG. 6 except for the hybrid temporal-SNR FGS video encoder 34. In this example, the hybrid video encoder 34 is configured to produce the scalability structure shown in FIG. 8A. As can be seen, the hybrid encoder 34 includes a temporal EL video encoder 36 and a FGS EL video encoder 38.

According to this example, the temporal EL video encoder 36 generates the temporal layer frames shown in FIG. 8A. As can be seen from FIG. 9, the temporal EL video encoder 36 includes a motion compensated residual image computation block 24 and a temporal motion compensated residual image (MCRI) EL encoder 40. During operation, the motion compensated residual image computation block 24 receives uncoded video data from the video source 2 and coded video data from the BL Encoder 8 in order to produce the MC residual images 22. In this example, the MC residual images 22 can be produced according to the same techniques described in regard to the Example of FIG. 6.

Still referring to FIG. 9, the temporal MCRI EL encoder 40 codes the MC residual images 22 to produce the temporal layer frames 42 at a bit rate of $R_{TL}$. The bit rate of $R_{TL}$ is determined based on the inputs from the calculation block 4. Further, the MC residual images 22 can be coded by any encoding scheme used for coding motion-compensated residuals. This includes the encoding schemes used by the MPEG-2, MPEG-4, and similar standards and coding algorithms. In particular, the encoding schemes used for traditional temporal scalabilities (such as the ones supported in MPEG-2 and MPEG-4 temporal scalable video coding tools) are good candidates.

According to this example, the FGS EL video encoder 38 generates the FGS layer frames shown in FIG. 8A. As can be seen from FIG. 9, the FGS EL video encoder 38 includes a residual image computation block 24 and FGS residual image El encoder 14. During operation, the residual image computation block 24 receives uncoded video data from the source 2, coded data from the BL encoder 8 and the temporal layer frames 42 in order to produce the residual images 12. The residual images are produced according to the techniques described in regard to the example of FIG. 6.

The FGS residual image EL encoder 14 codes the residual images 12 to produce the FGS enhancement layer frames 44. This can be accomplished by a fine-granular coding technique such as embedded bit plane DCT-based mechanisms (with variable/embedded quantization and transmission), the family of embedded zero tree wavelet methods or as a scalable matching pursuit based on an over-complete set of transform functions, etc.

As can be further seen from FIG. 9, a real time scalable video rate controller 18 is also included. During operation, the video rate controller 18 receives the BL stream, temporal EL stream 42 and FGS EL stream 44 in real time. As in the previous example, the video rate controller 18 determines the bit-rates that should be allocated for transmitting the enhancement layer frames. For example, in the case when frames from both the BL and temporal EL 42 streams have been transmitted, the allocation is performed based on the available bandwidth left to transmit frames from the FGS EL stream 44 ($R-R_{BL}-R_{TL}$), which is determined based on inputs from the calculation block 4.

Further, the video rate controller 18 also determines if one or both of the EL stream 42,44 should be transmitted. This determination also can be based on the available bandwidth and/or the user input 30. After this determination is performed, the video rate controller 18 outputs images to the variable-bandwidth network 43 as a BL stream, temporal EL stream and FGS EL stream. However, if temporal scalability is not desired, then only the BL stream and corresponding frames from the FGS EL stream is output.

Figure 10:
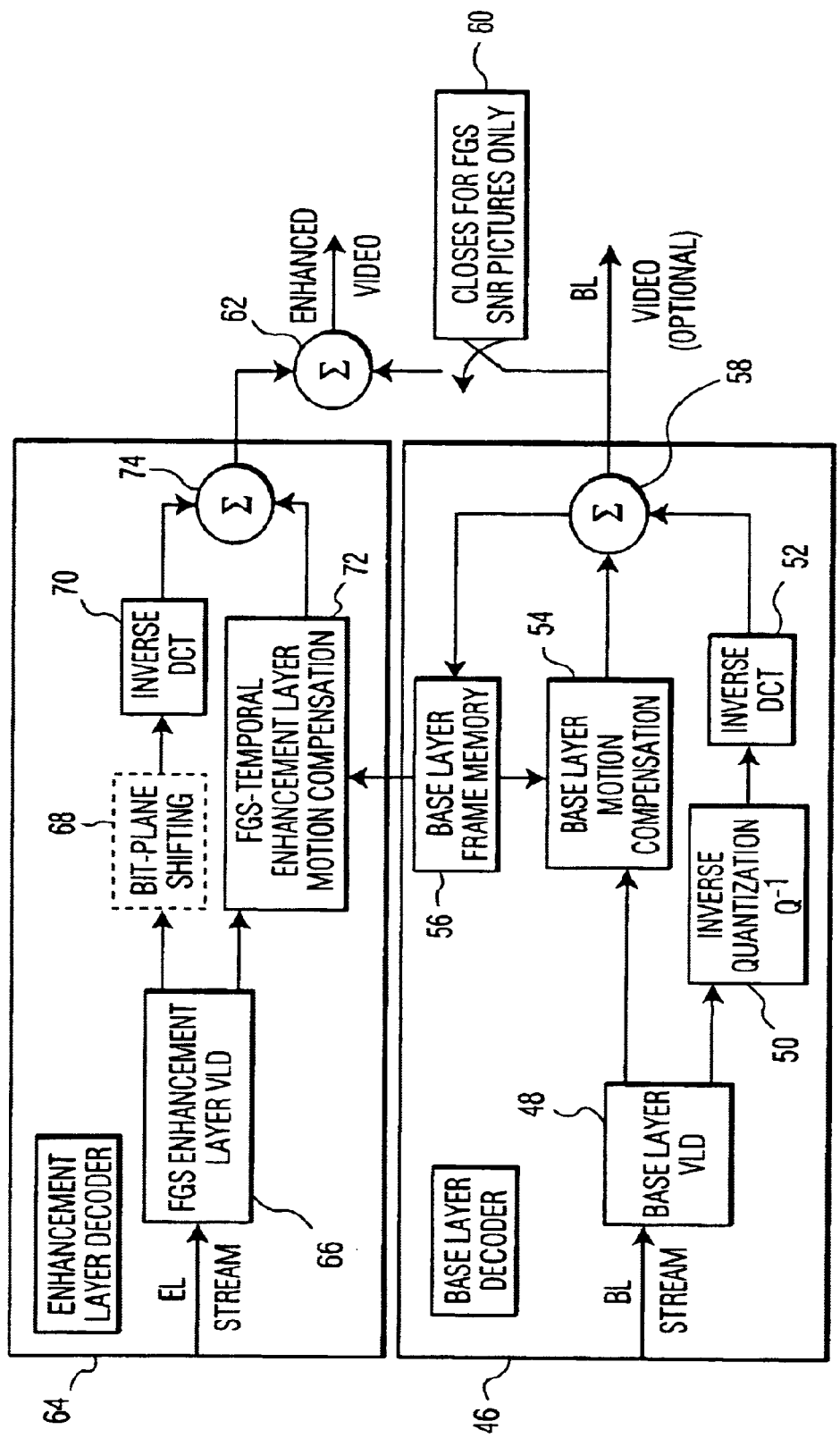
FIG. 10 shows one example of a decoder for the hybrid scalability structure according to the present invention.

One example of a decoder employing the hybrid scalability structure according to the present invention is shown in FIG. 10. The decoder of this example corresponds to the encoder of FIG. 6. In this example, the decoder includes a base layer decoder 46 for decoding the incoming BL stream and an enhancement layer decoder 64 for decoding the EL stream.

As can be seen, the base layer decoder 46 includes two parallel paths. The lower path includes a variable length decoder (VLD) 48, an inverse quantization block 50 and an inverse DCT block 52. During operation, these elements 48, 50,52 respectively perform variable length decoding, inverse quantization and inverse discrete cosine transforms on the BL stream to produce video frames at one input of the adder 58.

The upper path of the base layer decoder 46 also includes the variable length decoder 48 and a base layer motion composition block 54. During operation, the base layer motion composition block 54 receives motion vectors decoded by the VLD 48. The motion vectors are used to perform motion compensation on the frames stored in the base layer frame memory 56 to produce additional frames at the other input of the adder 58.

Further, during operation, the adder 58 combines the video frames from the lower path and the upper path to produce the BL video at the outputs of the adder 58, as shown. Further, one of the outputs of the adder 58 is coupled to the base layer memory 56 for temporarily storing each of the combined BL video frames. This will enable the frames produced by the base layer motion composition block 54 to be based on previous frames stored in the base layer memory 56.

As can be seen, the enhancement layer decoder 64 also includes two parallel paths. The lower path includes a FGS Enhancement layer VLD 66 and a FGS-temporal enhancement layer motion compensation block 72. During operation, the VLD 66 will perform variable length decoding on the incoming EL stream in order to supply motion vectors to the motion compensation block 72. The motion vectors will be used to perform motion compensation on the BL video frames from the base layer decoder 56 in order to produce motion-compensated enhancement layer frames at the input of adder 74.

The upper path of the enhancement layer decoder 64 also includes the VLD 66 and an inverse DCT block 70. These elements 66,70 will respectively perform variable length decoding and inverse discrete cosine transforms on the EL stream in order to produce residual FGS enhancement frames at the other input of the adder 74. The residual FGS enhancement frames include frames to enhance both the BL video frames and the motion-compensated enhancement layer frames. A bit-plane shifting block 68 would also be included in the upper path if bit plane shifting was performed on the encoder side.

During operation, the adder 74 is configured to combine the motion-compensated enhancement layer frames from the lower path with the corresponding residual FGS enhancement layer frames from the upper path to produce temporal enhancement layer frames. Further, the adder 74 is configured to pass the residual FGS enhancement layer frames from the upper path corresponding to the BL video frames unchanged to another adder 62.

During operation, the adder 62 combines the frames from both the enhancement layer decoder 64 and the base layer decoder 46 in order to produce an enhanced video sequence, as shown. However, in order to achieve quality scalability, the residual FGS enhancement layer frames will be added with the corresponding BL video frames from the base layer decoder 46. Therefore, if a residual FGS enhancement layer frame corresponding to the BL video frames is at the input of the adder 62, the switch 60 will close and enable the two frames to be combined.

Further, since the temporal enhancement layer frames do not have corresponding BL video frames, the temporal enhancement layer frames will be placed in the enhanced video sequence unchanged. Thus, if a temporal enhancement layer frame is at the input of the adder 62, the switch will open and the temporal enhancement layer frame will pass through the adder 62 unchanged. Therefore, the enhanced video sequence will be produced in this manner.

Figure 11:
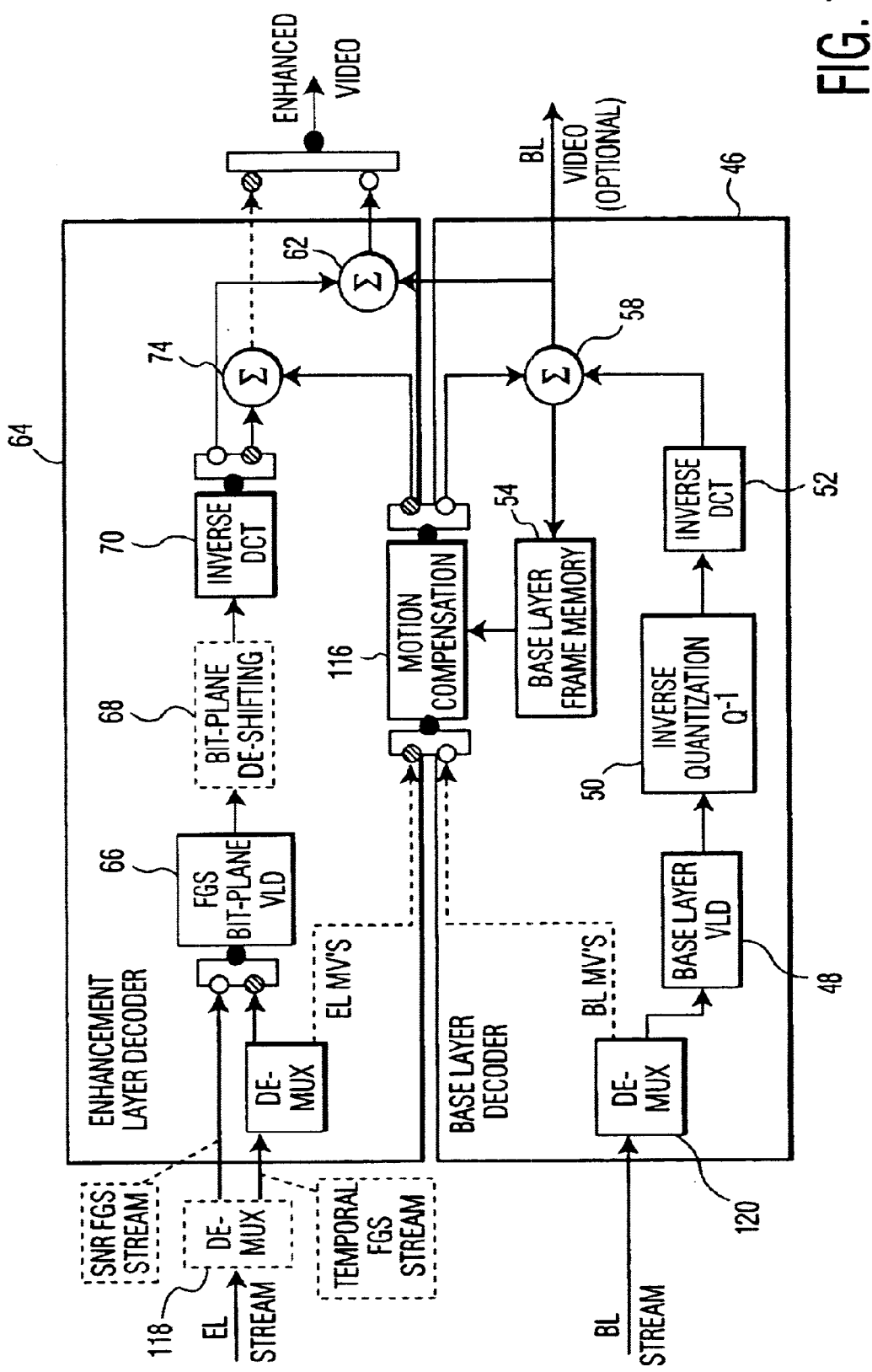
FIG. 11 shows another example of a decoder for the hybrid scalability structure according to the present invention.

Another example of a decoder employing the hybrid scalability structure according to the present invention is shown in FIG. 11. This example shows the corresponding functional architecture for the hybrid temporal-SNR FGS decoder. Similar to the encoder architecture of FIG. 7, the decoding of the temporal enhancement frames is realized with minimal complexity overhead. This is accomplished by sharing the motion-compensation functional block 116 between the base-layer decoder 46 and enhancement layer decoder 64. Further, the standard SNR FGS decoding path is also being shared. Although the DCT transform of the temporal enhancement frames can be computed by the DCT functional-block of the base-layer encoder (FIG. 7), at the receiver side, the inverse-DCT is computed using the inverse DCT block 70 of the enhancement-layer decoder 64.

As can be seen, the EL compressed stream is de-multiplexed 118 to separate the motion vector data from the coded residual information. The motion vectors corresponding to the temporal enhancement frames are used by the motion-compensation block 116 to compute the temporal predicted frame while the compressed residual information is decoded and inverse transformed by the enhancement-layer decoder 64. The two signals are added together to generate the temporal enhancement frames which can be sent directly to the display device. For the SNR-FGS compressed frames, the decoded signal has to be added to the corresponding base-layer frames before the display operation.

The BL compressed stream is also de-multiplexed 120 to separate the motion vector data from the coded residual information. The motion vectors corresponding to the BL frames are used by the motion-compensation block 116 to perform motion compensation based on the decoded base layer frames stored in the base layer memory 54.

Figure 12:
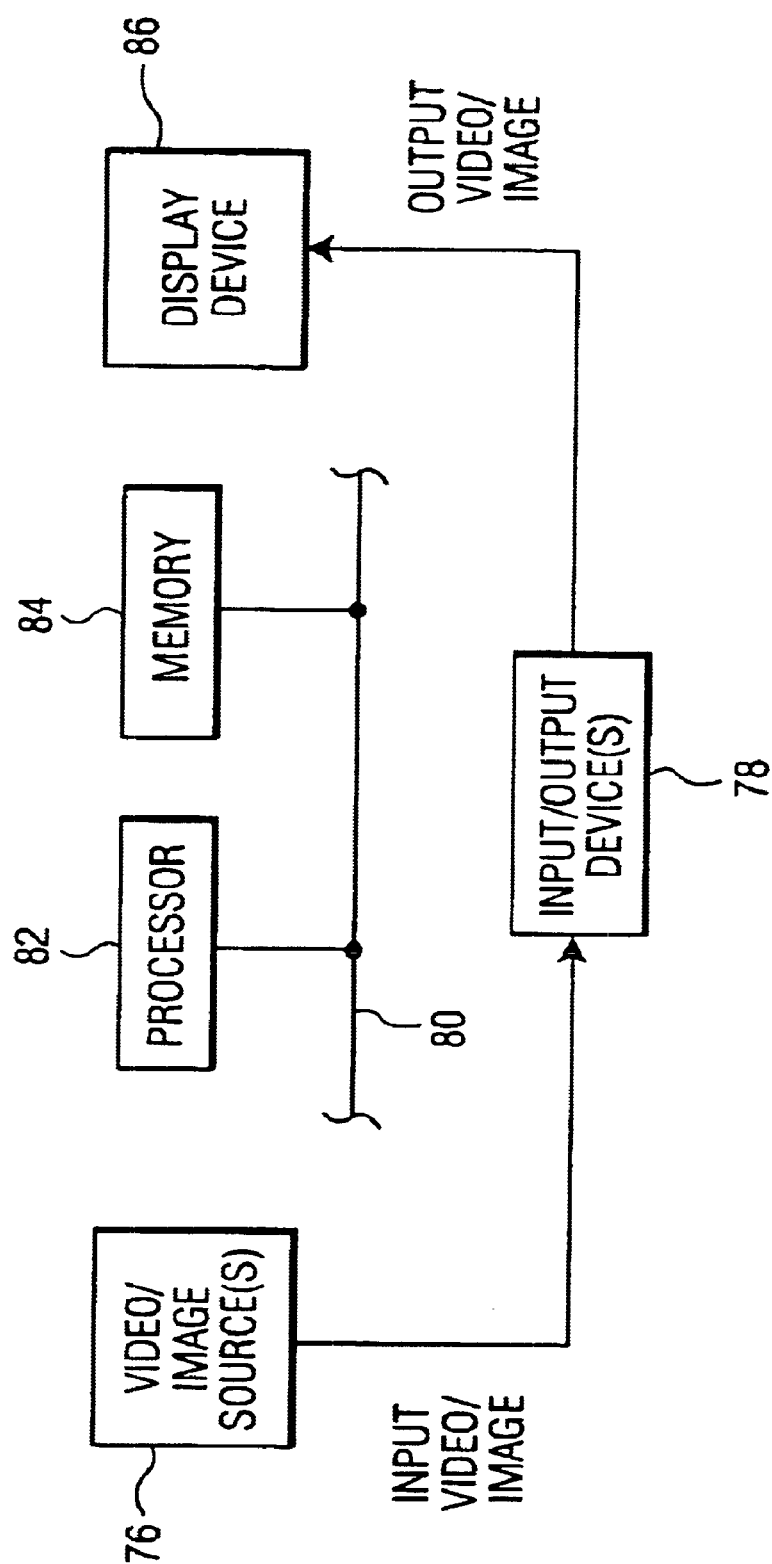
FIG. 12 shows one example of a system for implementing the present invention.

One example of a system in which the present invention may be implemented is shown in FIG. 12. By way of examples, the system may represent a television, a set-top box, a desktop, laptop or palmtop computer, a personal digital assistant (PDA), a video/image storage device such as a video cassette recorder (VCR), a digital video recorder (DVR), a TiVO device, etc., as well as portions or combinations of these and other devices. The system includes one or more video sources 76, one or more input/output devices 78, a processor 82 and a memory 84.

The video/image source(s) 76 may represent, e.g., a television receiver, a VCR or other video/image storage device. The source(s) 76 may alternatively represent one or more network connections for receiving video from a server or servers over, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

The input/output devices 78, processor 82 and memory 84 communicate over a communication medium 80. The communication medium 80 may represent, e.g., a bus, a communication network, one or more internal connections of a circuit, circuit card or other device, as well as portions and combinations of these and other communication media. Input video data from the source(s) 76 is processed in accordance with one or more software programs stored in memory 84 and executed by processor 82 in order to generate output video/images supplied to a display device 86.

In a preferred embodiment, the coding and decoding employing the hybrid scalability structure according to the present invention is implemented by computer readable code executed by the system. The code may be stored in the memory 84 or read/downloaded from a memory medium such as a CD-ROM or floppy disk. In other embodiments, hardware circuitry may be used in place of, or in combination with, software instructions to implement the invention. For example, the elements shown in FIGS. 6–7 and 9–11 also can be implemented as discrete hardware elements.

While the present invention has been described above in terms of specific examples, it is to be understood that the invention is not intended to be confined or limited to the examples disclosed herein. For example, the invention is not limited to any specific coding strategy frame type or probability distribution. On the contrary, the present invention is intended to cover various structures and modifications thereof included within the spirit and scope of the appended claims.

What is claimed is:

1. A method for coding video data, comprising the steps of coding a portion of the video data to produce base layer frames;
    generating motion compensated residual images from the video data and the base layer frames; and
    coding the motion compensated residual images using a fine granular coding technique to produce temporal enhancement frames.

2. The method of claim 1, which further includes transmitting the base layer frames and portions of the temporal enhancement frames over a variable bandwidth network.

3. The method of claim 2, which further includes: determining an available bandwidth of the network;
    selecting the portions of the temporal enhancement frames to be transmitted based on the available bandwidth.

4. The method according to claim 1, which further includes:
    generating residual images from the video data and the base layer frames; and
    coding the residual images using a fine granular coding technique to produce quality enhancement frames.

5. The method of claim 4, which further includes combining the temporal enhancement frames and the quality enhancement frames into an enhancement layer.

6. The method of claim 4, which further includes transmitting the base layer frames and portions of the temporal enhancement frames and quality enhancement frames over a variable bandwidth network.

7. The method of claim 6, which further includes:
    determining an available bandwidth of the network;
    selecting the portions of the temporal enhancement frames and the quality enhancement frames to be transmitted based on the available bandwidth.

8. A method for coding video data, comprising the steps of coding a portion of the video data to produce base layer frames;
    generating motion compensated residual images from the video data and the base layer frames;
    coding the motion compensated residual images to produce temporal enhancement frames;

generating residual images from the video data, the base layer frames and the temporal enhancement frames; and coding the residual images using a fine granular coding technique to produce quality enhancement frames.

9. The method of claim 8, wherein the temporal enhancement frames form a temporal enhancement layer and the quality enhancement frames form a quality enhancement layer.

10. A method of decoding a video signal including a base layer and an enhancement layer, comprising the steps of:

decoding the base layer to produce video frames;

decoding the enhancement layer to produce motion vectors;

performing motion compensation on the video frames according to the motion vectors to produce additional video frames; and combining the video frames and the additional video frames to form a video sequence.

11. The method of claim 10, which further includes:

decoding the enhancement layer to produce enhanced video frames; and adding each of the enhanced video frames to one of the video frames and the additional video frames.

12. A memory medium including code for encoding video data, the code comprising:

a code to encode a portion of the video data to produce base layer frames;

a code to generate motion compensated residual images from the video data and the base layer frames; and a code to encode the motion compensated residual images using a fine granular coding technique to produce temporal enhancement frames.

13. A memory medium including code for encoding-video data, the code comprising:

a code to encode a portion of the video data to produce base layer frames;

a code to generate motion compensated residual images from the video data and the base layer frames;

a code to encode the motion compensated residual images to produce temporal enhancement frames;

a code to generate residual images from the video data, the base layer frames and the temporal enhancement frames; and a code to encode the residual images using a fine granular coding technique to produce quality enhancement frames.

14. A memory medium including code for decoding a video signal including a base layer and an enhancement layer, the code comprising:

a code to decode the base layer to produce video frames;

a code to decode the enhancement layer to produce motion vectors;

a code to perform motion compensation on the video frames according to the motion vectors to produce additional video frames; and a code to combine the video frames and the additional video frames to form a video sequence.

15. An apparatus for coding video data, comprising:

means for coding a portion of the video data to produce base layer frames;

means for generating motion compensated residual images from the video data and the base layer frames; and means for coding the motion compensated residual images using a fine granular coding technique to produce temporal enhancement frames.

16. An apparatus for coding video data, comprising:

means for coding a portion of the video data to produce base layer frames;

means for generating motion compensated residual images from the video data and the base layer frames;

means for coding the motion compensated residual images to produce temporal enhancement frames;

means for generating residual images from the video data, the base layer frames and the temporal enhancement frames; and means for coding the residual images using a fine granular coding technique to produce quality enhancement frames.

17. An apparatus for decoding a video signal including a base layer and an enhancement layer, comprising the steps of:

means for decoding the base layer to produce video frames;

means for decoding the enhancement layer to produce motion vectors;

means for performing motion compensation on the video frames according to the motion vectors to produce additional video frames; and means for combining the video frames and the additional video frames to form a video sequence.

* * * * *